(12) United States Patent
Chase

(10) Patent No.: US 6,502,765 B1
(45) Date of Patent: Jan. 7, 2003

(54) LIQUID SPRAY APPARATUS, SYSTEM AND METHODS

(75) Inventor: Steve Chase, Aurora, CO (US)

(73) Assignee: Chase Industries, Inc., Aurora, CO (US)

( * ) Notice: Subject to any disclaimer, the term of this patent is extended or adjusted under 35 U.S.C. 154(b) by 0 days.

(21) Appl. No.: 09/686,001

(22) Filed: Oct. 10, 2000

(51) Int. Cl.$^7$ ................................................ B05B 3/00
(52) U.S. Cl. ..................... 239/227; 239/751; 239/587.1
(58) Field of Search ................................ 239/750, 751, 239/752, 753, 227, 264, 587.1; 134/123, 45, 57 R, 185

(56) References Cited

U.S. PATENT DOCUMENTS

| | | |
|---|---|---|
| 3,349,783 A | 10/1967 | Ellis |
| 4,230,067 A | 10/1980 | Iwamoto et al. ............ 118/104 |
| 4,865,058 A | 9/1989 | Crotts et al. |
| 4,920,997 A | 5/1990 | Vetter et al. |
| 4,946,513 A | 8/1990 | Del Prato et al. |
| 4,981,523 A * | 1/1991 | Larson et al. ................. 134/45 |
| 4,995,136 A | 2/1991 | Smith ........................ 15/312.1 |
| 5,033,490 A | 7/1991 | Wade .......................... 134/123 |
| 5,040,485 A | 8/1991 | Bailey et al. ............... 118/680 |
| 5,076,304 A | 12/1991 | Mathews ...................... 134/57 |
| 5,090,429 A | 2/1992 | Barber ......................... 134/57 |
| 5,104,044 A | 4/1992 | Ratell, Jr. ................... 239/240 |
| 5,141,165 A | 8/1992 | Sharpless ..................... 239/752 |
| 5,188,293 A | 2/1993 | Burton ........................ 239/227 |
| 5,226,436 A | 7/1993 | Kirby .......................... 134/57 |
| 5,316,219 A | 5/1994 | Christyson ................ 239/533.1 |
| 5,320,121 A | 6/1994 | Alexanian |
| 5,390,128 A | 2/1995 | Ryan ..................... 364/474.35 |
| 5,413,128 A | 5/1995 | Butts ............................ 134/56 |
| 5,715,558 A | 2/1998 | Johnson ....................... 15/53.3 |
| 5,788,365 A | 8/1998 | Hunt ........................... 362/301 |
| 5,853,127 A | 12/1998 | Heembrock .................. 239/227 |
| 5,865,374 A | 2/1999 | Barta et al. ............... 239/263.1 |
| 5,886,648 A | 3/1999 | McElroy et al. ............ 340/943 |
| 5,921,659 A | 7/1999 | Hunt ........................... 362/233 |
| 6,017,133 A | 1/2000 | Grasmuller et al. ......... 362/252 |
| 6,082,634 A | 7/2000 | MacNeil ...................... 239/263 |
| 6,277,207 B1 | 8/2001 | Gauthier |
| 6,283,135 B1 | 9/2001 | Fratello et al. |

OTHER PUBLICATIONS

*Professional Carwashing & Detailing*, Jul., 1999, p. 88.
*Professional Carwashing & Detailing*, "AutoHandWash" Ad.—Date unknown.
*Professional Carwashing & Detailing*, Jul., 1999, p. 5.
*Professional Carwashing & Detailing*; "Magic Wand" Ad.—Date unknown.
*Professional Carwashing & Detailing*, May, 2000, p. 101.
*Professional Carwashing & Detailing*; "Hanna–Sherman" Ad.—date unknown.
Nordson Corporation Web Site printout—date unknown.
Syncrolite Spec Sheet, from Syncrolite Website—www.syncrolite.com/images date unknown.
*Professional Carwashing & Detailing*; Jul., 2000, p. 75.
*Professional Carwashing & Detailing*; Feb., 2000, p. 41.
*Professional Carwashing & Detailing*; Feb., 2000, p. 85.
*Professional Carwashing & Detailing*; Oct., 1995, p. 75.

(List continued on next page.)

*Primary Examiner*—Lisa A. Douglas
(74) *Attorney, Agent, or Firm*—Townsend and Townsend and Crew, LLP

(57) ABSTRACT

In one embodiment a spray apparatus includes a nozzle assembly (12) containing six nozzles (14) coupled to a high pressure water feed line (16) and one or more chemical nozzles (20) coupled to chemical feed lines (18). The apparatus includes first and second rotators (22, 32) for rotating the nozzle assembly about generally perpendicular first and second axii (30, 36) through ranges of rotation that are less than 360 degrees.

55 Claims, 14 Drawing Sheets

OTHER PUBLICATIONS

*Professional Carwashing & Detailing*; Jul., 1999, p. 45.
*Professional Carwashing & Detailing*; Aug., 2000, p. 59.
*Water Wizard Ad*, Jim Coleman Company, 5842 W. 34th Street, Houston, TX 77092—Date unknown.
*Eagle® PTE–120 Pan Tilt Head*, www.displaydevices.com/products.html, Date unknown.
*Magic Wand Car Wash Systems*, www.magicwandcarwash.com, Date unknown.
*Eliminator*, www.macneil.on.ca, Date unknown.
*Vector Rapid Wash*, www.vectorwash.com and www.belangerinc.com, Date unknown.

*Hanna–Sherman International, Inc.*, www.hanna–sherman.com and http://209.238.229.41/components, Last updated: Oct. 21, 2000.

*Hanna–Sherman International, Inc.*, www.hanna–sherman.com/components/sprwv–arch, Last updated: Oct. 21, 2000.

*Hanna–Sherman International, Inc.*, www.hanna–shermn.com/components/autoprep, Date unknown.

*Helix Cross Cleaning System*, www.macneil.on.ca, Date unknown.

\* cited by examiner

LIQUID SPRAY APPARATUS, SYSTEM AND METHODS

BACKGROUND OF THE INVENTION

The present invention is directed to liquid spray apparatus, systems and methods, and will find particular use in the vehicle washing industry.

Vehicle wash systems can be broken down into three general groups: self-service washes, roll over washes, and conveyor washes. Self-service washes are generally coin operated wash equipment in open bays for the general public to wash their own vehicle. Roll over washes exist in fairly short buildings which consist of a moving gantry that travels on tracks mounted on either the floor or building walls. The gantry moves back and forth over a stationary vehicle applying soaps, cleaners, waxes and rinses. Finally, conveyor washes are usually long conveyors that either push or pull a vehicle through a series of stationary arches. In touch free washes, these arches apply cleaners, high pressure water, waxes, rinses and dryers. Friction washes will use cloth or plastic brushes, and more recently foam pads.

Notwithstanding the different types of vehicle wash systems, the car wash industry is in search of new and better ways to contour the multitudes of different sizes and shapes of vehicles that need to be washed, without the possibility of damaging the vehicle. To date, no one has found a way to control the wash process so as to be able to wash any and all vehicles in a way that not only cleans the entire vehicle, but does so cost effectively without wasting soap and water, as may be the case when all vehicles are sprayed the same regardless of their size or shape.

It is desirable, therefore, to provide an exemplary vehicle wash system which accurately contours a wide range of vehicle shapes and sizes and provides exemplary cleaning ability. Further, it would be preferable to have such a wash system be adapted for use with other industries that require the high pressure spraying of fluids, related or unrelated to cleaning processes.

SUMMARY OF THE INVENTION

The present invention provides exemplary apparatus, systems and methods for spraying one or more liquids. In one embodiment, apparatus of the present invention are directed to the vehicle wash industry, and provide an exemplary vehicle wash system and methods. One advantage of the present invention involves a nozzle assembly that is rotated about two axii to provide exemplary cleaning. In one embodiment, the rotation about each of the two axii is less than 360°. In this manner, the undesired winding of water or chemical feed lines is avoided. Additional characteristics and advantages of the present invention will be described below in conjunction with the accompanying figures.

In one embodiment, a spray apparatus for spraying one or more liquids according to the present invention comprises a nozzle assembly having a plurality of nozzles adapted to be coupled to a liquid source. The apparatus includes a first rotating means for rotating the assembly about a first axis through a first range of rotation and a second rotating means for rotating the assembly about a second axis, generally perpendicular to the first axis, through a second range of rotation. In one embodiment, the first and second ranges of rotation are less than 360 degrees. In this manner, the two axii of rotation provide exemplary spraying characteristics, and the less than 360 degree rotation range prevents unwanted winding of feed lines, control lines and the like which may be connected to the nozzle assemblies. Such an apparatus will be particularly useful for washing systems, such as a vehicle washing system.

In one aspect, a controller simultaneously controls the first and second rotating means to cause the nozzles to spray a liquid in a nonlinear trajectory. In another embodiment, the first and second rotator means comprise first and second rotators, such as a stepper motor, an AC motor, a servo motor, an air-operated rotation device and the like. In one embodiment, the first rotator operates to tilt the nozzle assembly and the second rotator operates to pan the nozzle assembly. In another embodiment, a third rotator operates to rotate the nozzle assembly about a third axis in a continuous 360 degree range of rotation.

In another embodiment of the present invention, a vehicle washing system for cleaning a vehicle includes a gantry having an upper generally horizontal portion coupled between two generally vertical side portions. A plurality of nozzle assemblies each having a plurality of nozzles for dispensing a fluid are coupled to the gantry. Each of the nozzle assemblies are coupled to a rotator mechanism for rotating the assemblies about two generally perpendicular axii.

In one aspect, the washing system further includes a track on which the gantry is adapted to move, and a distance measurement device for measuring a distance the gantry moves along the track. In another aspect, the system includes a vehicle measurement device for determining a vehicle height, and/or a vehicle width. A controller in one aspect determines a vehicle profile by combining data from the distance measurement and vehicle measurement devices. In another aspect, a second gantry, similar to the first, is provided. In one embodiment, the two gantries form a stationary frame capable of washing a stationary vehicle.

The present invention further provides exemplary methods for spraying one or more liquids. In one embodiment, the method includes providing a spray apparatus as described herein, rotating the nozzle assembly about the two axii, and spraying liquid from at least one of the nozzles. In one embodiment, the nozzle assembly is rotated through less than a 360 degree range of rotation about the two axii.

In another embodiment, a method for washing a vehicle includes positioning a vehicle underneath the gantry as described herein, providing relative movement between the gantry and vehicle to produce a vehicle size profile comprising a height of the vehicle as a function of the vehicle length, and spraying the vehicle with a liquid from at least some of the nozzle assemblies. The system used herein preferably has at least one controller for controlling nozzle assembly operation and/or gantry operation. The relative movement can be provided by moving the gantry, moving the vehicle, or moving both.

Other objects, features and advantages of the present invention will become more fully apparent from the following detailed description, the appended claims and the accompanying drawings.

DESCRIPTION OF THE SPECIFIC EMBODIMENTS

Figure 1A:
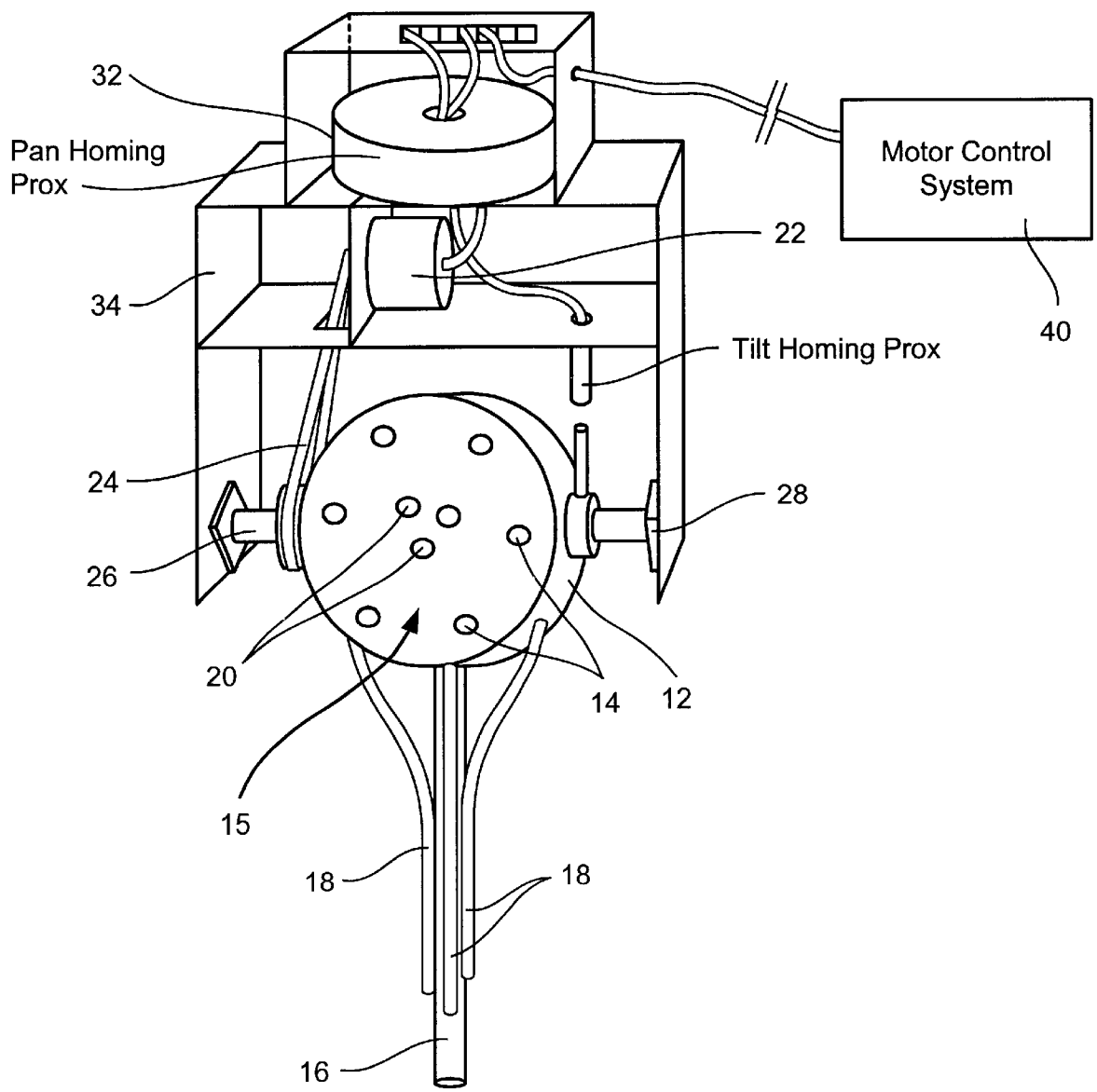
FIG. 1A depicts a simplified perspective view of a spray apparatus according to the present invention.
Figure 1B:
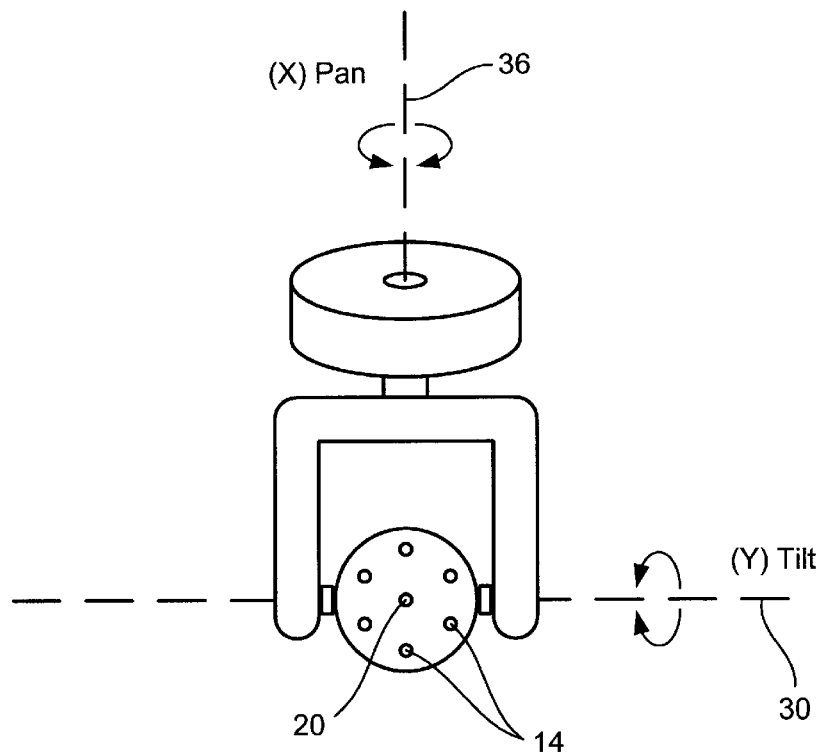
FIG. 1B depicts portions of the apparatus of FIG. 1A.

FIGS. 1A and 1B depict an exemplary spray apparatus 10 according to the present invention. Apparatus 10 includes a nozzle housing or assembly 12 (also shown in FIGS. 2A–2C) containing a plurality of nozzles 14. As shown, nozzle housing 12 contains six nozzles 14 spaced generally equally about the periphery of a face 15 of nozzle housing 12. It will be appreciated by those skilled in the art that a larger or smaller number of nozzles 14, as well as a different positioning of nozzles 14, may be used within the scope of the present invention. Spray apparatus 10 includes a high pressure water feed line 16 which provides water or other fluids to nozzles 14. Feed line 16 is coupled to a water or other fluid source for delivering same to nozzles 14. Apparatus 10 further includes one or more chemical feed lines 18 for transferring a variety of chemicals to one or more chemical nozzles 20. As shown in FIG. 1A, three chemical feed lines 18 are coupled to three chemical nozzles 20, which are positioned near the center of the nozzle housing outer face 15. In an alternative embodiment, FIG. 1B depicts a single nozzle 20 approximately centered within housing 12. In one embodiment, apparatus 10 is used in a vehicle washing facility, and chemical feed lines 18 deliver soap, wax, cleaners, rust inhibitors and the like to nozzle(s) 20.

Apparatus 10 further includes a first rotator 22 depicted as a step motor 22 in FIG. 1A. Rotator 22 may comprise a wide range of step measuring devices or rotary devices capable of rotating nozzle housing 12 as described below. In alternative embodiments, rotator 22 comprises a stepper motor, an AC motor, a servo motor, air operated rotary devices including pneumatic devices, and the like. In one embodiment, rotator 22 is coupled to a support 26 by a belt 24. Chains, straps and other devices may be used in place of belt 24 provided they are capable of transferring rotational movement of rotator 22 to support 26. Support 26 is coupled to nozzle assembly 12, and slidably coupled to a first casing 34 by bearings 28 located on an inner surface of the first casing 34. Casing 34 houses rotator 22, nozzle housing 12 and support 26.

Rotator 22 operates to rotate or tilt nozzle assembly 12 about a first rotational axis 30 as shown in FIG. 1B. In one embodiment, rotator 22 operates to rotate housing 12 through about a one hundred and eighty degree (180°) range of rotation. In an alternative embodiment, the range of rotation is less than 180°. In this manner, chemical feed lines 18 and high pressure water feed line 16 do not get wrapped around support 26, as would likely occur with a full three hundred and sixty degree (360°) rotation of support 26. In an alternate embodiment (not shown), rotator 22 rotates assembly 12 through 360 degrees or greater range of rotation. In such an embodiment, it may be desirable to supply lines 16, 18 through support 26 to prevent unwanted wrapping around support 26.

Apparatus 10 further includes a second rotator 32 coupled to first casing 34. As shown in FIG. 1B, second rotator 32 provides a panning motion of first casing 34, and hence of nozzle assembly 12. Second rotator 32 operates to rotate first casing 34 and components therein about a second rotational axis 36. In one embodiment, rotator 32 rotates casing 34 through a range of rotation that is about 350° or less. In an alternate embodiment, rotator 32 rotates casing 34 through a range of rotation that equals or exceeds 360 degrees. Lines 16, 18 preferably remain untangled as casing 34 is rotated. Apparatus 10 further includes a motor control system 40 to operate rotators 22 and 32, and provide additional functions as described below.

In one embodiment, nozzles 14 are zero degree (0°) nozzles. Zero degree nozzles operate by projecting water or other fluid under high pressure and have a nozzle shape which generally directs the water in a tight narrow beam having about 0° dispersion. One advantage of zero degree nozzles is the high impingement of water dispensed from such nozzles several feet from the nozzle itself. For example, fluid dispensed from a zero degree nozzle still has about 75% of its pressure at a distance of about six feet from the nozzle. In an alternative embodiment, five degree (5°) nozzles are used for nozzles 14, which provide approximately a 5° dispersion of fluid ejected from nozzles 14. In still another embodiment, fifteen degree (15°) nozzles are used for nozzles 14. In still another embodiment, nozzles 14 comprise some combination of 0°, 5°, 15°, or the like nozzles. Similarly, nozzles 20 may comprise 0°, 5°, 15° or the like nozzles. In one embodiment, it is less critical to have 0° or 5° nozzles used for chemical nozzles 20, due in part to the reduced need to eject cleaners or other chemicals at high pressures to impinge upon a surface. Nozzles 20 are intended to provide wider coverage of the chemicals over, for example, the vehicle being washed.

Figure 2A:
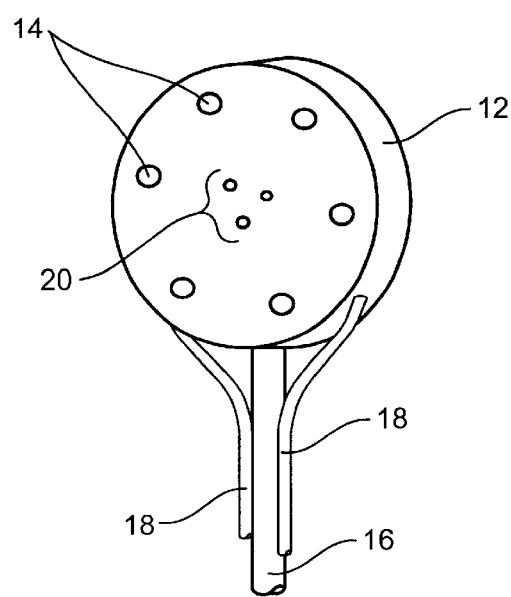
FIG. 2A depicts an overall view of a nozzle assembly according to the present invention.
Figure 2B:
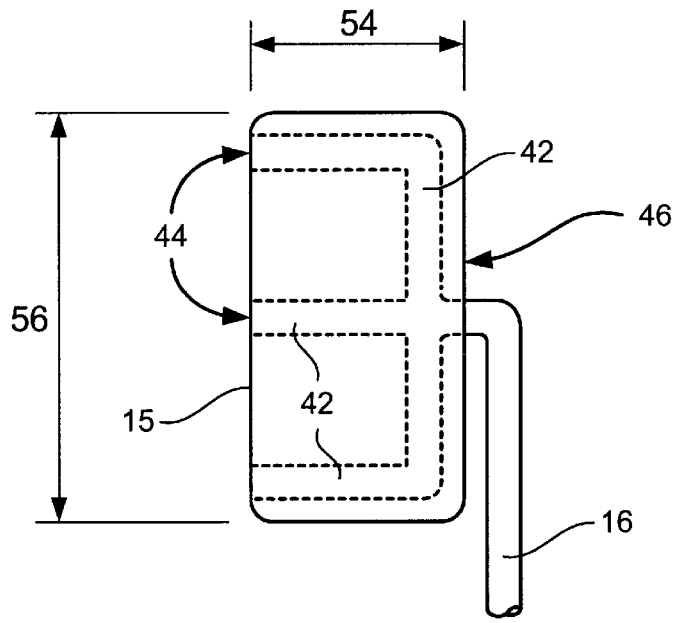
FIGS. 2B and 2C depict simplified side views of the nozzle assembly of FIG. 2A.
Figure 2C:
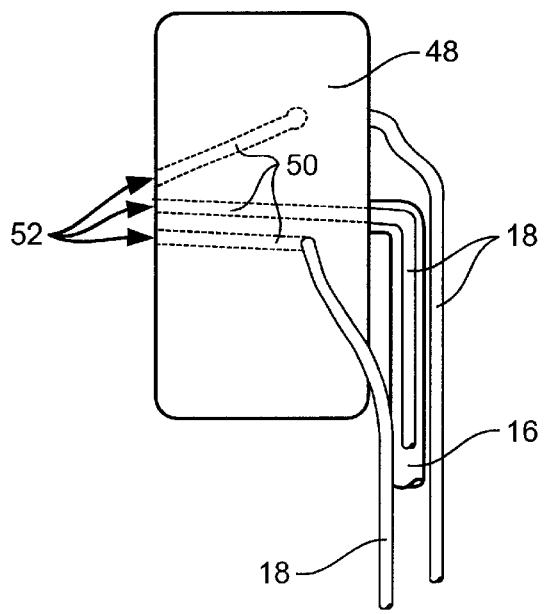

Turning now to FIGS. 2A–2C, additional details of nozzles 14, 20 and nozzle housing 12 will be described. As shown in FIG. 2A, in one embodiment, six nozzles 14 are generally equally spaced about nozzle assembly 12 and three chemical nozzles 20 are positioned near the approximate center of assembly 12. For convenience, a single high pressure water feed 16 is coupled to a backside 46 of assembly 12 to provide a source of water to six water channels 42 (three shown in FIG. 2B) within assembly 12. It will be appreciated by those skilled in the art that more than one water feed 16 may be used to supply water or other fluid to nozzle assembly 12. Channels 42 are formed within assembly 12 such that each nozzle 14 has an exit plane 44 from which the water is ejected under high pressure. For example, pressures may range from about 600 pounds per square inch (PSI) to about 1,200 PSI for a vehicle wash system, and in one embodiment is about 1,000 PSI. Other pressures also may be used within the scope of the present invention. Exit plane 44 is configured such that nozzle 14 has a desired dispersion of fluid exiting nozzle assembly 12 at exit plane 44. As previously noted, in one embodiment, nozzles 14 are configured to be 0° nozzles and have an exit plane 44 accordingly.

FIG. 2B is a simplified side view showing water feed 16 configured to supply water to channels 42. FIG. 2C is a simplified side view showing chemical feed lines 18 providing chemicals or other desired fluids to one or more channels 50 within nozzle assembly 12. As with water channels 42, chemical channels 50 define an exit plane 52 which provides a desired dispersion of the chemicals, soap, cleaner, wax and the like from nozzles 20. It will be appreciated by those skilled in the art that greater or smaller numbers of nozzles 14 and 20 and channels 42 and 50 may be used within the scope of the present invention. Similarly, while FIG. 2B depicts feed line 16 entering assembly 12 at a backside 46 thereof, feed line 16 also may enter assembly 12 from one or more sides, such as a side 48. Additionally, while chemical feed lines 18 are shown entering side 48 of assembly 12, they too may enter assembly 12 by way of backside 46 or other locations.

In one embodiment, assembly 12 has a depth 54 that is about three inches and a diameter 56 that is about four inches, although different sizes of assembly 12 may be used within the scope of the present invention. Nozzle assembly 12 preferably comprises a stainless steel, although other materials may be used. Nozzle assembly is formed, in one embodiment, from a four inch stainless steel block. In another embodiment, channels 42 comprise one-half inch (0.5 in) female pipe thread (FPT) and channels 50 are used by forming one-quarter inch (0.25 in) FPT. Again, the size of channels 42 and 50 may vary within the scope of the present invention. Similarly, the configuration and layout of channels 42 and 50 may vary according to the present invention. For example, channels 42 may all angle from the middle of backside 46 where feed line 16 enters towards the periphery of nozzle assembly face 15. Apparatus 10 is configured such that nozzles 14 and 20 can operate simultaneously or in series. For example, high pressure water delivery may occur through all six nozzles 14 at the same time that wax, soap or other chemicals are provided through one or more of the three center-most nozzles 20.

Figure 3A:
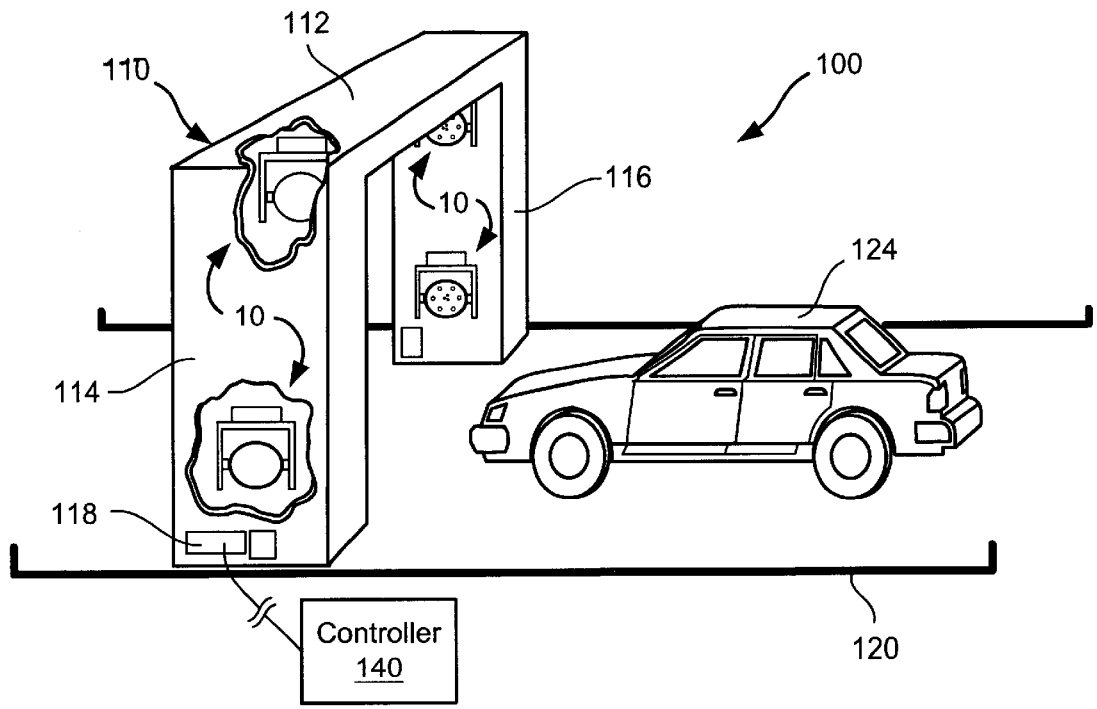
FIG. 3A depicts a simplified overview of a liquid spray system according to the present invention in the form of a vehicle washing system.
Figure 3B:
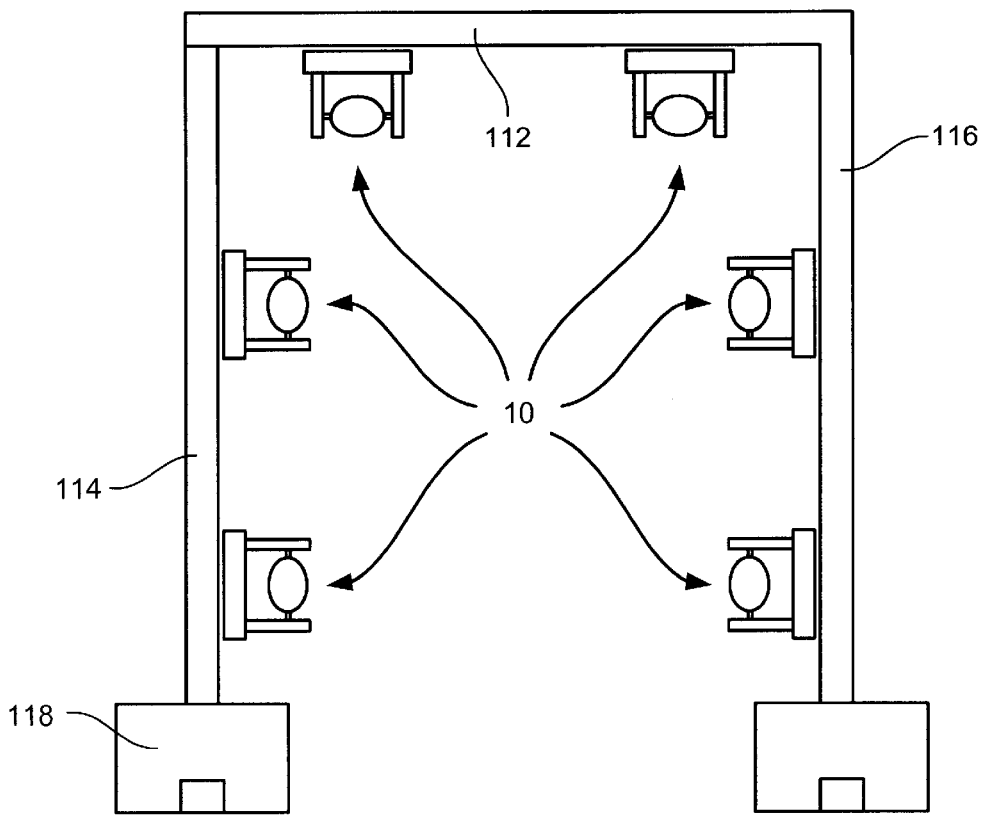
FIG. 3B depicts a front view of the system shown in FIG. 3A.

Turning now to FIGS. 3A and 3B, an exemplary vehicle washing system 100 according to an embodiment of the present invention will be described. System 100 includes a gantry 110 having an upper generally horizontal portion 112 and first and second generally vertical side portions 114 and 116. Portions 112–116 are coupled to form a generally inverted U shape of sufficient size to permit the passage of most personal or recreational vehicles thereunder. As shown in FIG. 3A, system 100 is designed to permit a vehicle 124 to remain generally stationary during a cleaning procedure. In addition to the two axis motion of nozzle apparatus 10 as described in conjunction with prior figures and below, gantry 110 is configured to travel along a track 120 by way of a drive motor system 118. In one embodiment, drive motor system 118 includes a gear (not shown) which interacts with a gear or toothed track 120 to permit controlled travel of gantry 110 down track 120. The movement of gantry 110 is controlled by controller 40, as shown in FIG. 1A, or a system controller 140 coupled to gantry 110. In an alternative embodiment, track 120 is located on a wall, such as within a building that contains system 100.

With particular reference to FIGS. 1B, 3A and 3B, an exemplary method according to the present invention will be described. Once vehicle 124 has come to a stop within system 100, gantry 110 travels along track 120 and calculates the height profile of vehicle 124 as described in conjunction with FIG. 3C below. In one embodiment, system 110 also calculates the width profile of vehicle 124. The wash procedure preferably begins with gantry 110 near one end of track 120. The front portion of vehicle 124 will generally be cleaned by the two uppermost nozzle assemblies 12 positioned near upper portion 112 of gantry 110 as shown in FIG. 3A. The present invention is particularly efficient at using a combination of pan and tilt motion to clean vehicle 124 in an exemplary fashion. As previously noted, in one embodiment nozzles 14 comprise 0° or 5° nozzles. Hence, nozzles 14 do not have a wide dispersion pattern, notwithstanding the fact vehicle 124 may be several feet away from nozzles 14. System 100 takes advantage of the tilt and pan qualities of apparatus 10 to clean vehicle 124. Further, nozzle assembly 12 is adapted to aim at most any point of vehicle 124 and follow vehicle contours.

In one embodiment, nozzles 14 project high pressure water toward the front of vehicle 124 as nozzle assembly 12 pans from left to right (or right to left) approximately 30 degrees, as shown in FIG. 1B. After panning about 30°, rotator 22 operates to tilt assembly 12 approximately 3° up (or down depending upon where the wash procedure starts) after which rotator 32 pans assembly 12 approximately 30° back in the other direction. Apparatus 10 continues this procedure panning approximately 30°, tilting up approximately 3°, panning back the other direction approximately 30°, tilting up approximately 3°, until the front portion of vehicle 124 has been impinged by water from nozzles 14. In alternative embodiments, assembly 12 may pan between about 10 degrees and about 100 degrees, between about 20 degrees and about 60 degrees, and the like. Similarly, assembly 12 may tilt between about 1 degree and about 90 degrees, between about 1 degree and about 15 degrees, and the like. It will be appreciated by those skilled in the art that alternative ranges of pan and tilt may be used within the scope of the present invention.

In addition to panning and tilting assembly 12 in a step like pattern, the combination of panning and tilting motions may be performed simultaneously. In this manner, high pressure water has a nonlinear trajectory profile and impinges on vehicle 124 in a generally circular, oval, spiral or Z-shaped pattern depending in part upon the rates at which assembly 12 tilt and pan occur. Controller 40 operates to control both rotators 22 and 32 to efficiently direct nozzles 14 so water or other fluids impinge on vehicle 124. Additionally, controller 40 can be programmed to control nozzle assembly 14 to focus on particular parts of vehicle 124, such as the front of vehicle 124 during bug season, the rear of vans and sport utility vehicles, windshields, side mirrors, front and rear spoilers, tires and wheels, wheelwells, and the like.

In similar fashion, two nozzle apparatus 10 shown mounted on vertical side portions 114, 116 in FIG. 3A operate to clean the sides of vehicle 124, including the wheels and wheelwells. Again, controller 40 operates to control rotators 22 and 32 such that a panning and tilting combination of motions sufficiently wash the side surface of vehicle 124. In one embodiment, apparatus 10 directed to clean the sides of vehicle 124 are programmed to pan between about ten (10) degrees to about ninety (90) degrees, and tilt between about ten (10) degrees to about one hundred (100) degrees. In one particular embodiment, side cleaning apparatus 10 are operated to tilt more than pan during certain side cleaning processes.

It will be appreciated by those skilled in the art, that after a few moments the reachable portions of vehicle 124 will have been impinged with high pressure water from nozzles 14. At this point, gantry 110 will travel down track 120 to permit additional surface area of vehicle 124 to be impinged with high pressure water. In one embodiment, gantry 110 stops periodically to permit nozzles 14 to direct fluids at vehicle 124 using the combined pan and tilt motions. Alternatively, in one embodiment, gantry 110 travels down track 120 simultaneous with the operation of nozzle assemblies 12 to direct water toward vehicle 124. When gantry 110 passes the rear of vehicle 124, apparatus 10 have sufficient range of motion to permit their turning nozzles 14 to face the rear of vehicle 124 and proceed with washing the rear, including the bumper area, in a similar fashion as the front of the vehicle. In one embodiment, the alternating 30 degree pan and 3 degree tilt combination is used. As previously noted, in one embodiment, rotator 32 provides approximately 350° range of motion, thus permitting the use of the same apparatus 10 for washing both the front and rear of vehicle 124, provided gantry 110 travels a sufficient distance down track 120.

In an alternative embodiment shown in FIG. 3B, each vertical support 114, 116 has two nozzle apparatus 10 to provide better coverage of the side of vehicle 124. Such an embodiment may be particularly useful for washing larger vehicles, such as sport utility vehicles, commercial trucks, large recreational vehicles, and the like. It will be appreciated by those skilled in the art that the number of nozzle apparatus 10 may vary within the scope of the present invention. In some embodiments, six (6), eight (8), ten (10), twelve (12), fifteen (15), twenty (20) or twenty-four (24) nozzle apparatus 10 are used. Each apparatus 10 also may have a greater or lesser number of nozzles 14 than depicted. Additionally, it will be appreciated by those skilled in the art that the present invention has other exemplary uses. For example, buses, heavy equipment and even airplanes may be washed provided system 110 is of sufficient size and has a sufficient number of nozzle apparatus 10 to provide sufficient coverage of the desired vehicle or item to be washed.

As previously noted, in one embodiment nozzle(s) 20 are positioned near the approximate center of face 15 of nozzle assembly 12. This positioning helps prevent chemical feed lines 18 from winding or twisting, as would likely be the case if nozzle assembly 12 continuously rotated. Further, nozzles 20 are configured to dispense soap or other liquids during a washing process. In the embodiment shown in FIG. 2A, three different chemicals, having the same or different appearance or color, can be dispensed in series or at the same time.

Figure 3C:
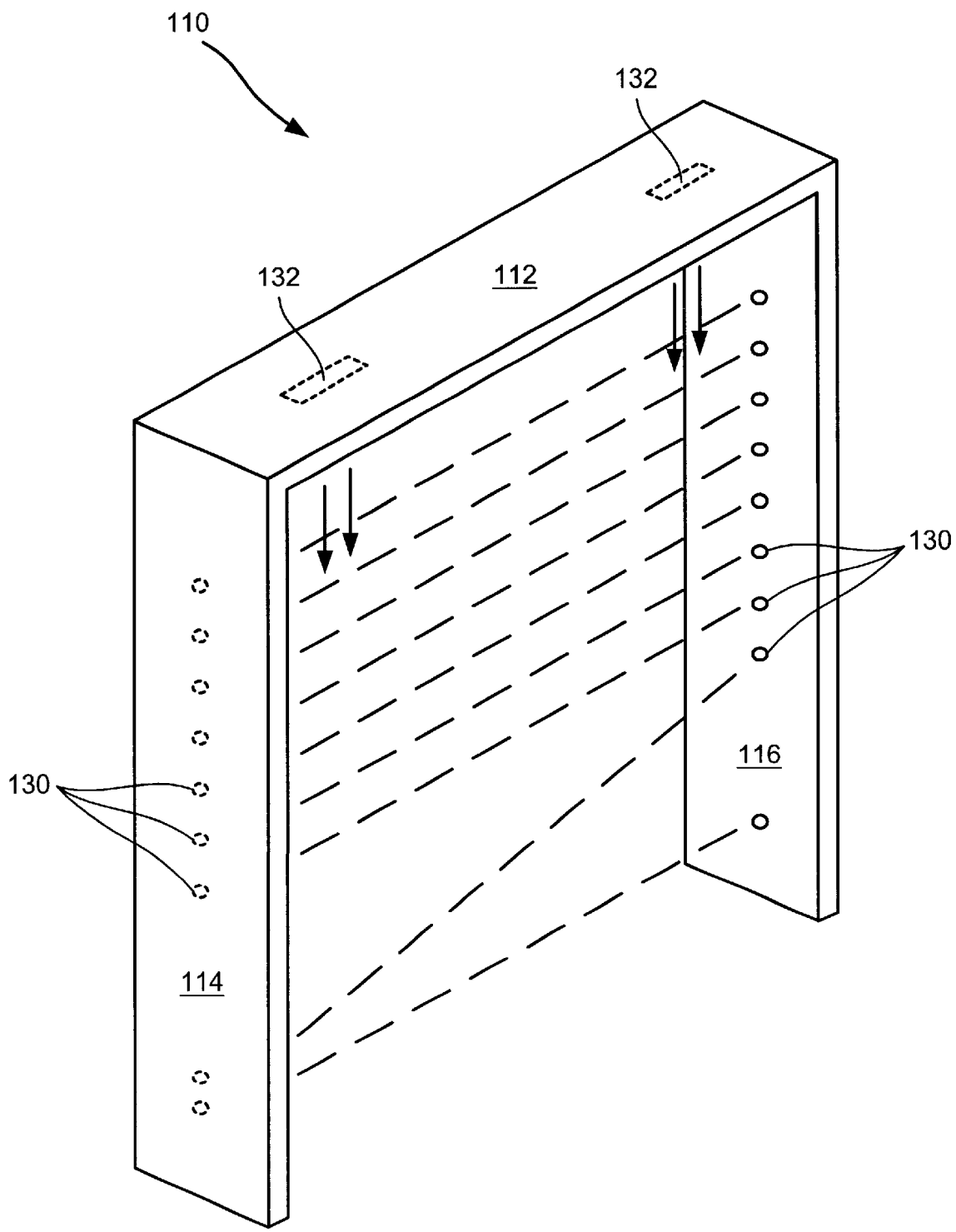
FIG. 3C depicts portions of the system depicted in FIG. 3A.

One shortcoming of prior art washing systems is the indiscriminate spraying of water, soap and other fluids regardless of the size of the vehicle being washed. The present invention preferably uses a vehicle sizing mechanism so system 100 sprays water and other fluids more directly at vehicle 124, a greater percent of the time. As previously noted, in one embodiment, gantry 110 passes over vehicle 124 prior to commencing the high pressure spraying process. In one embodiment, gantry 110 has a plurality of sensors 130 located on opposing surfaces of vertical supports 114 and 116. By way of example and not limitation, sensors 130 may include optic eyes, proximity sensors, laser-type sensors, ultrasonic sensors, photoelectric eyes, and the like. Sensors 130 are positioned in pairs, with one sensor coupled to vertical support 114 and the other sensor coupled to vertical support 116. Sensors 130 operate to detect the height of vehicle 124 as gantry 110 travels down track 120 as shown in FIG. 3C. In short, vehicle 124 breaks a plane between an opposing pair of sensors 130 depending upon the height of the vehicle that passes between vertical supports 114 and 116. The system controller, such as controller 40, monitors the height of vehicle 124 as gantry 110 travels over and past vehicle 124 by determining the uppermost pair of sensors 130 that detect the vehicle, or the lowermost pair of sensors that do not detect the vehicle.

In one embodiment drive motor gear box 118 has a gear which interacts with a corresponding gear on track 120. Preferably, controller 40 or system controller 140 calculates the distance gantry 110 travels by, for example, counting the gear revolutions (or fractions thereof). Controller 40, 140 coordinates the gantry distance counter, with the sensor 130 readings to create a vehicle 124 profile. The vehicle profile includes the height profile as a function of a vehicle length. In this manner, as gantry 110 subsequently travels down track 120 during the washing procedure, controller 40 is able to direct apparatus 10 to provide an appropriate amount of pan and tilt to impinge the vehicle, and not spray past or over the vehicle.

Similarly, in one embodiment, gantry 110 further includes one or more sensors 132 located in upper horizontal portion 112. Sensors 132 may be similar to sensors 130, and in one embodiment are sonar-proximity sensors. Sensors 132 operate to detect the width of vehicle 124. In one embodiment, sensors 132 calculate the reflection of the transmitted ultrasonic signal from either the floor of the washing facility or from the vehicle itself. In may be less crucial to measure the width of vehicle 124, in part because gantry 110 will be designed to be wide enough to accommodate most vehicles. Further, apparatus 10 that are shown coupled to upper horizontal member 112 are preferably set off to the side (i.e., close to vertical support members 114, 116). This pair of apparatus 10 directs water through nozzles 14 at an angle slightly toward the center of vehicle 124. In the event controller 40 believes vehicle 124 is wider than it actually is, uppermost apparatus 10 will have portions of the water ejected therefrom impinging on the front quarter panels or sides of vehicle 124, not directly past vehicle 124.

Figure 4A:
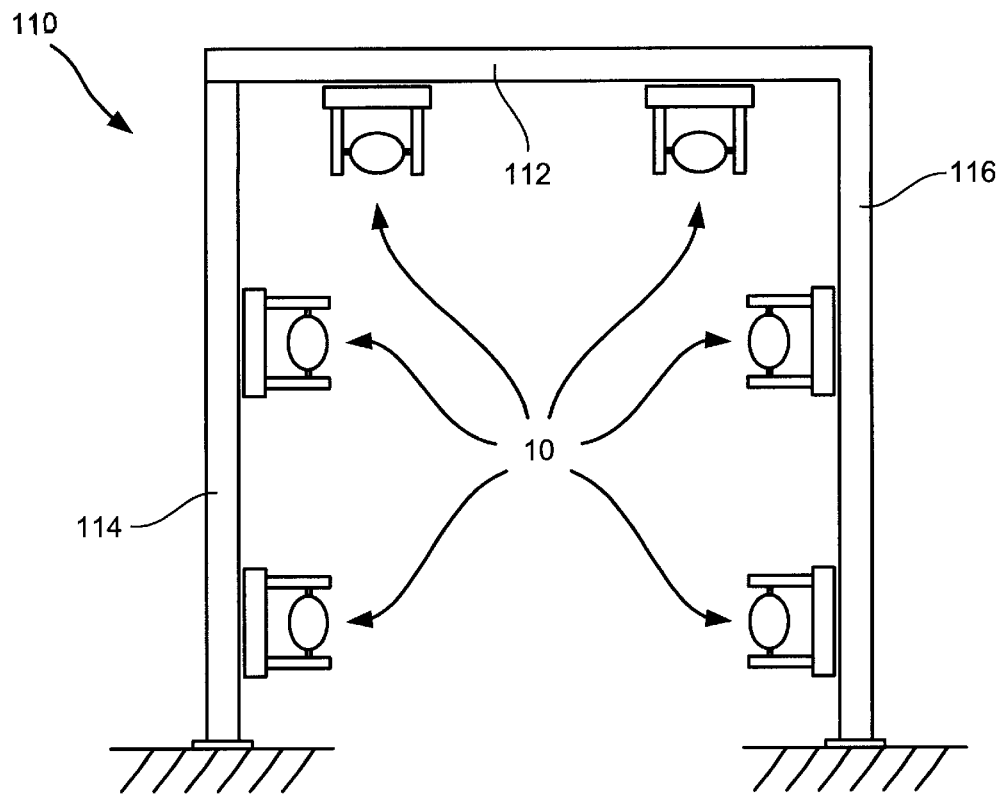
FIGS. 4A and 4B depict alternative embodiments of systems according to the present invention.

While FIGS. 3A–C is directed to a moving gantry and a stationary vehicle, it will be appreciated by those skilled in the art that the present invention will find use for the reverse situation, namely, a stationary gantry and a moving vehicle. As shown in FIG. 4A, gantry 110 is configured in a stationary position and vehicle 124 drives or is conveyed under gantry 110 at a desired speed. A vehicle washing system may include one, two, three or more gantries 110 to perform, for example, pre-wash, wash and rinse processes.

Figure 4B:
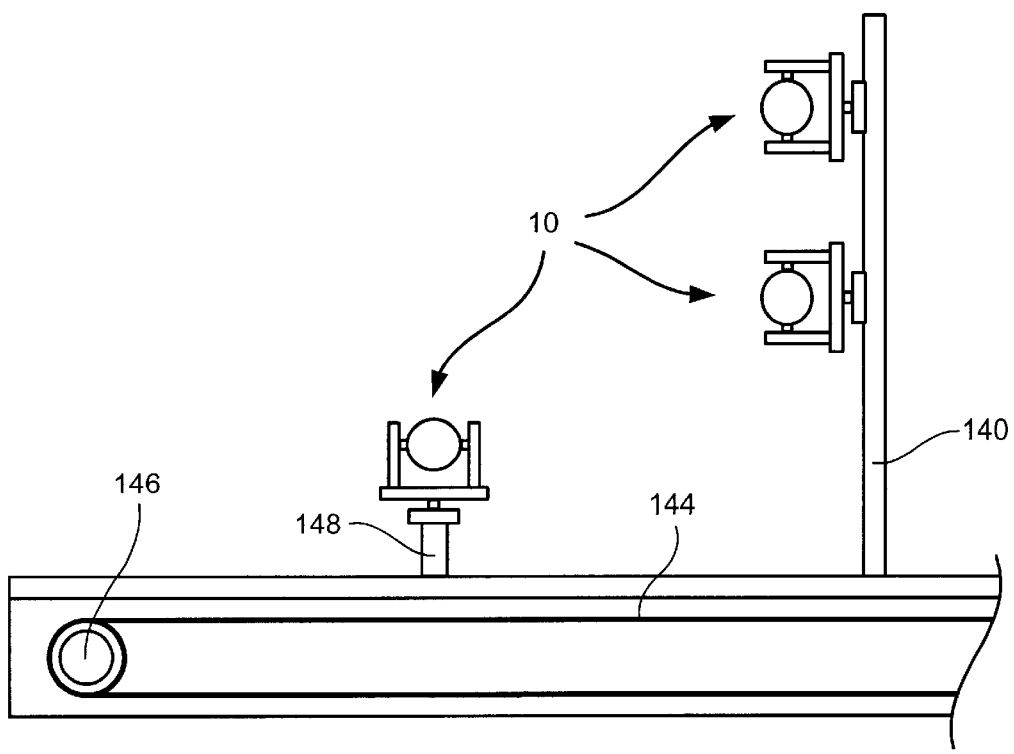

For the embodiment shown in FIG. 4B, a conveyor 144 operates to translate vehicle 124 down conveyor 144 and past a vertical support member 140 containing two or an alternative number of apparatus 10 of the present invention. Similarly, one or more apparatus 10 is coupled to a support 148 that is positioned so that apparatus 10 washes the rocker panels, wheelwells and wheels of the passing vehicle. In one embodiment, support 148 provides a variable height setting for apparatus 10 mounted thereon. In one embodiment, a drive train 146 operates to rotate conveyor 144 and translate vehicle 124 past support member 140.

Figure 5A:
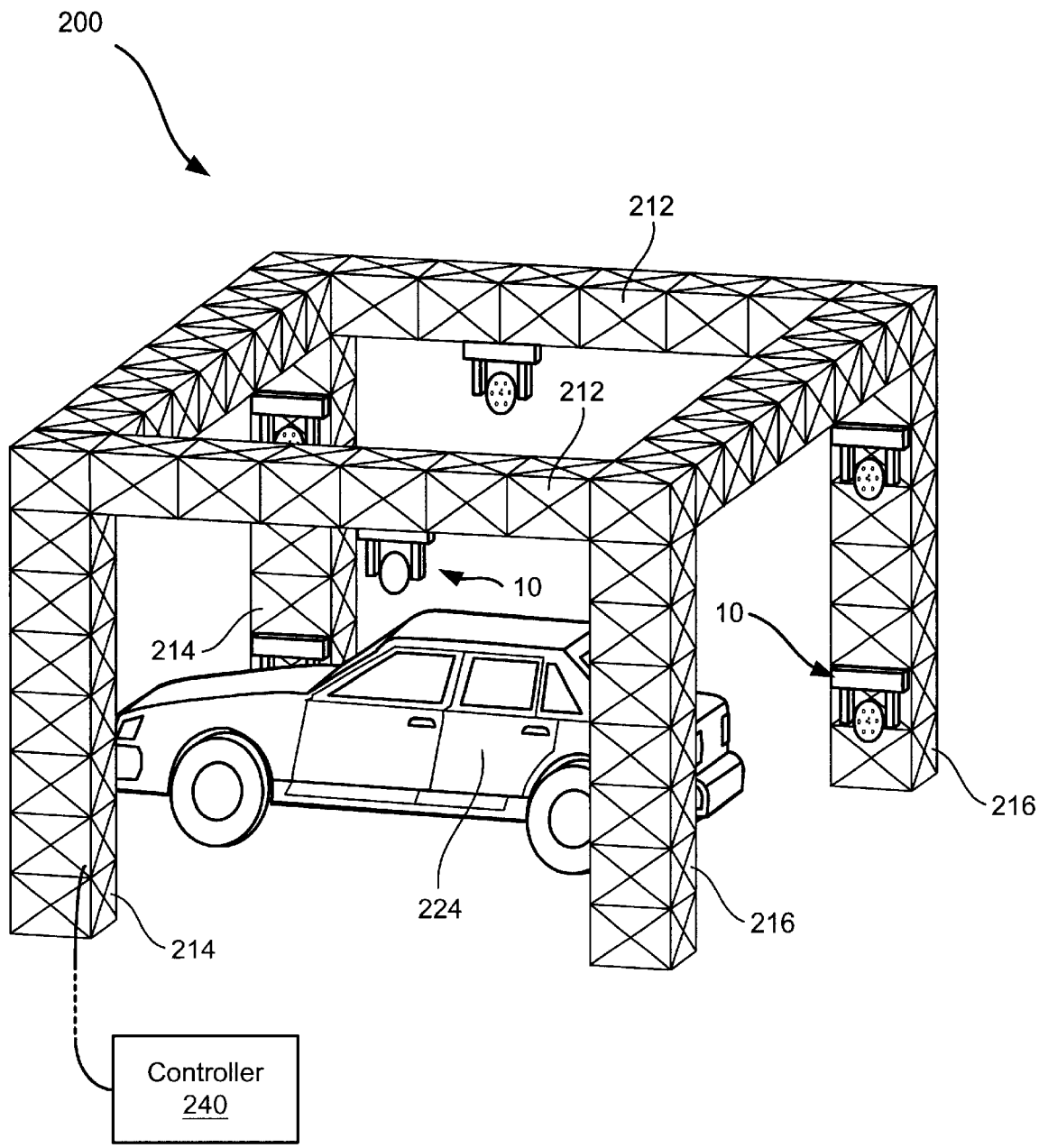
FIGS. 5A and 5B depict an overall perspective and a top view, respectively, of an alternative spray system according to the present invention.
Figure 5B:
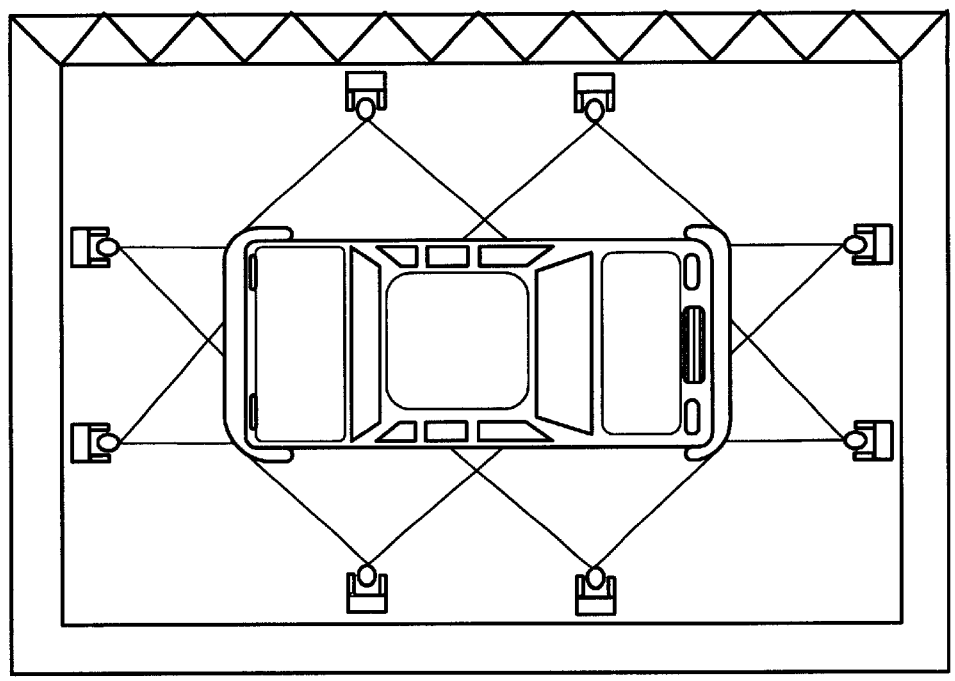
Figure 5C:
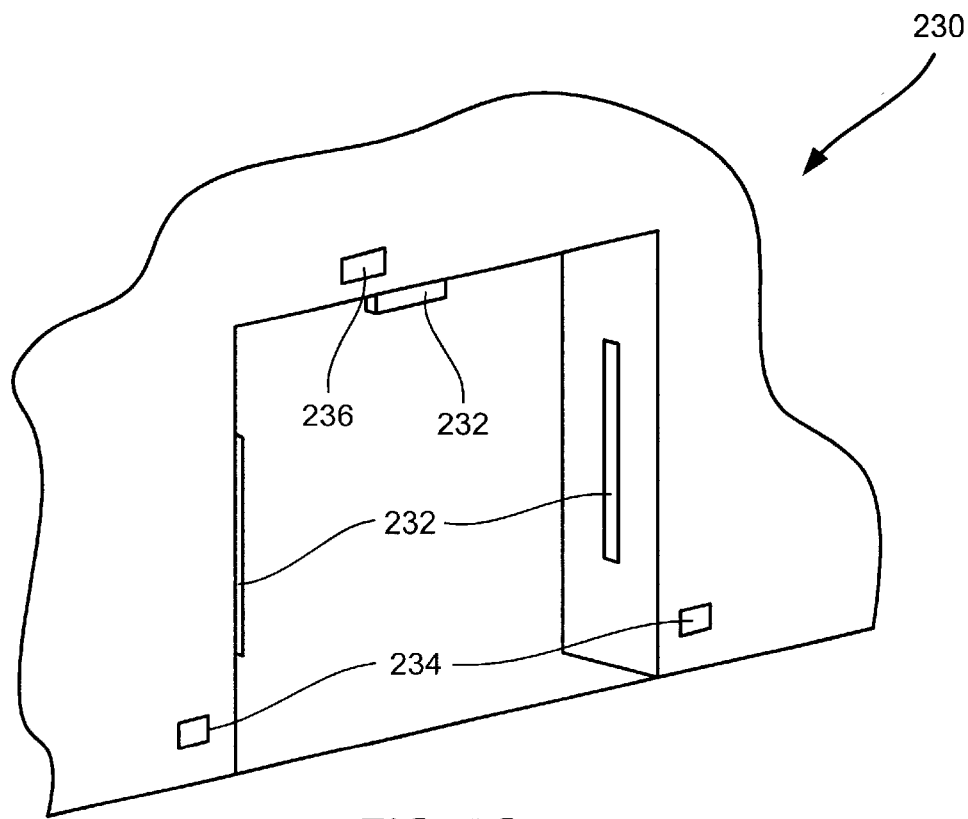
FIG. 5C depicts a simplified portion of the system shown in FIGS. 5A and 5B.

Turning now to FIGS. 5A–5C an alternative embodiment of the present invention will be described. FIG. 5A depicts a vehicle washing system 200 having a stationary gantry 210 which is adapted to wash a stationary vehicle 224. In such a configuration, gantry 210 comprises two generally identical inverted U-shaped members, each having an upper generally horizontal portion 212 and generally vertical portions 214 and 216. A plurality of nozzle apparatus 10 are mounted about gantry 210 to provide exemplary coverage when washing vehicles 224. In one embodiment, each vertical support 214, 216 has an apparatus 10 mounted near a lower portion and near an upper portion thereof. In such a manner, eight apparatus 10 are mounted to the vertical portions 214 and 216. Similarly, each horizontal portion 212 has a single apparatus 10 containing a cluster of nozzles 14 for washing vehicle 224. It will be appreciated by those skilled in the art that a different number, both greater and fewer, of apparatus 10 may be used according to the present invention. The number of apparatus 10 used in system 200 will depend, in part, upon the size of vehicle that system 200 is intended to wash and the thoroughness of the desired cleaning. For example, one or both horizontal portions 212 may have two or more apparatus located thereon. In alternative embodiments, system 200 uses eight (8) apparatus 10, ten (10) apparatus 10, twelve (12) apparatus 10, or sixteen (16) apparatus 10.

Stationary system 200 uses an alternative method of calculating the size of vehicle 224. In one embodiment, system 200 is adapted to receive information on the make and model of vehicle 224 such that a system controller 240 (or controller 40) knows the approximate dimensions of vehicle 224. In one embodiment, controller 40 or 240 contains a database with the dimensions of one or more vehicles 224. Once the vehicle make and/or model is input, controller 240 can direct system 200 to wash vehicle 224 without indiscriminately spraying water or chemicals that do not impinge vehicle 224. In one embodiment, system 200 has a floor sensor which directs the vehicle operator to stop vehicle 224 at a desired position within system 200 so vehicle 224 is in the line of fire of water and chemicals.

In an alternative embodiment, a camera such as a digital camera (not shown) is properly positioned in or near system 200 to image vehicle 224. For example, the camera may be positioned on portion(s) 212. The image of vehicle 224 is provided to controller 40 or 240 to provide a vehicle profile of vehicle 224. Vehicle profile preferably includes a vehicle height as a function of vehicle length, and also may include a vehicle width as a function of vehicle length. Such a camera and method of use also may be applied to other embodiments of the present invention, including those depicted in FIGS. 3A–3C and 4A.

Alternatively, as shown in FIG. 5C, a detection system 230 is provided. Detection system 230 includes sensors 232 as described in conjunction with FIG. 3C. Sensors 232 may be a vertical bank of sensors positioned on an inner doorway through which vehicle 224 passes when entering system 200. As described in conjunction with FIG. 3C, sensors 232 operate to measure the height of the vehicle as it passes. Similarly, sensor 232 mounted on a ceiling portion of the entryway can operate to calculate the width of vehicle 224. In one embodiment, detection system 230 includes photo-optic or infrared eyes 234 which determine the point at which vehicle 224 begins to enter through the entryway. The data collected by sensors 234 is coupled with the known speed of vehicle 224 when entering system 200 as calculated by a speed detector 236. The combination of data from speed detector 236 and sensors 234 operate to provide a counter profile in a similar fashion as with the moving gantry embodiment described in earlier figures. Controller 40 or 240 then directs apparatus 10 to wash the vehicle, with a reduced amount of wasted water.

Figure 6A:
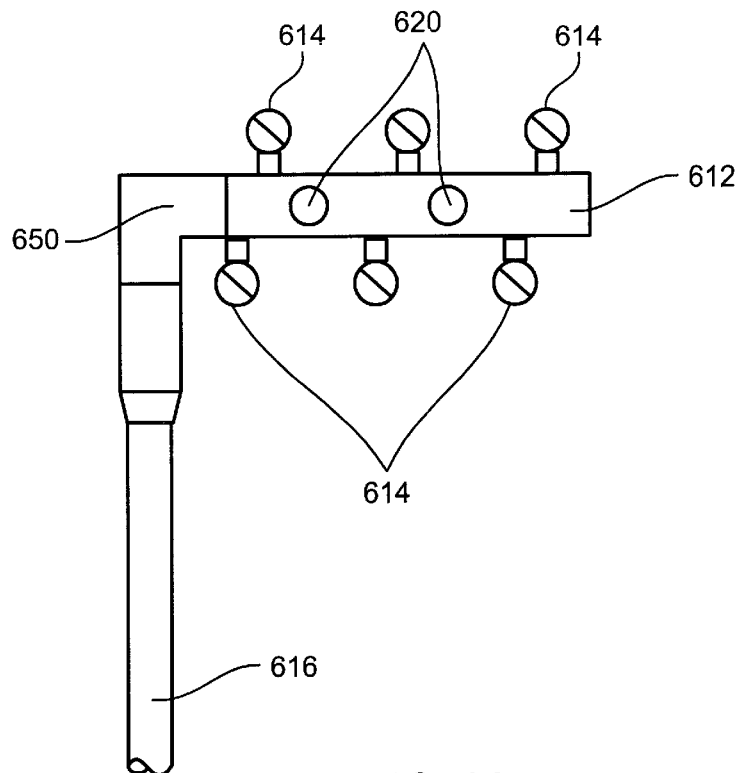
FIGS. 6A–6C depict an alternative nozzle assembly configuration according to the present invention.
Figure 6B:
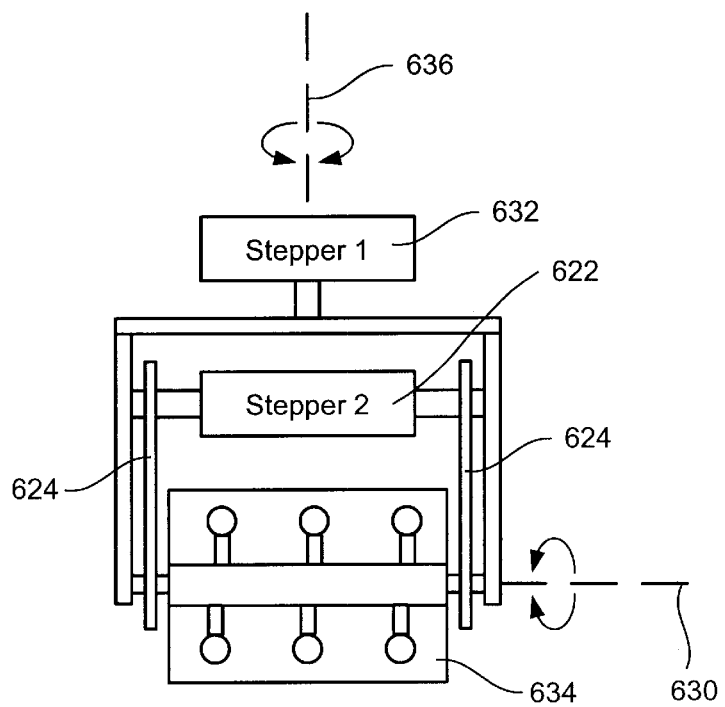
Figure 6C:
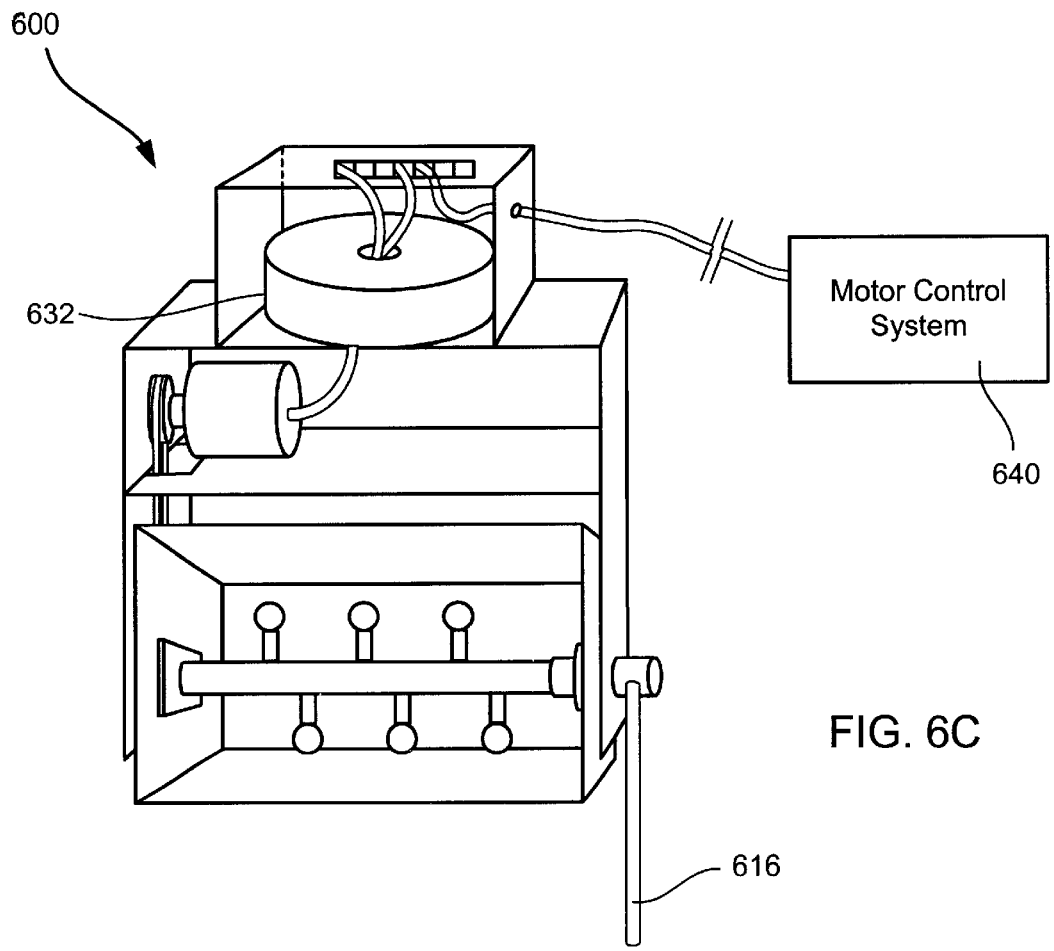

Turning now to FIGS. 6A–6C, an alternative embodiment of the present invention will be described. An apparatus 600 shown therein is similar to apparatus 10 except that the housing assembly has a different configuration. As shown in FIG. 6A, a nozzle assembly 612 has a generally cylindrical or tubular shape and has a plurality of nozzles 614 coupled to an outer surface thereof. A water feed line 16 is coupled to a swivel mechanism 650 which in turn is coupled to nozzle assembly 612. Chemical feed lines (not shown) run proximate with water feed line 616 and couple to one or more chemical nozzles 620 contained within nozzle assembly 612. The operation of apparatus 600 is similar to that described in conjunction with FIGS. 1 and 2. Namely, a first rotator 222 operates by way of a belt or other linking mechanism, to cause the tilting rotation of nozzle 614 about a first axis 630. As shown in FIG. 6B, belt 624 is coupled to a shaft which in turn is coupled to a casing that houses nozzle assembly 612. Similarly, a second rotator 632 operates to provide a panning motion about a second axis 636. Again, as shown in FIG. 6C, rotators 622 and 632 are coupled to a controller 640, such as a motor control system, for operating and coordinating rotator 622, 632 motion. Swivel mechanism 650 operates to position nozzle assembly 12 in front of, behind, or next to the side of a vehicle to be washed.

Figure 7A:
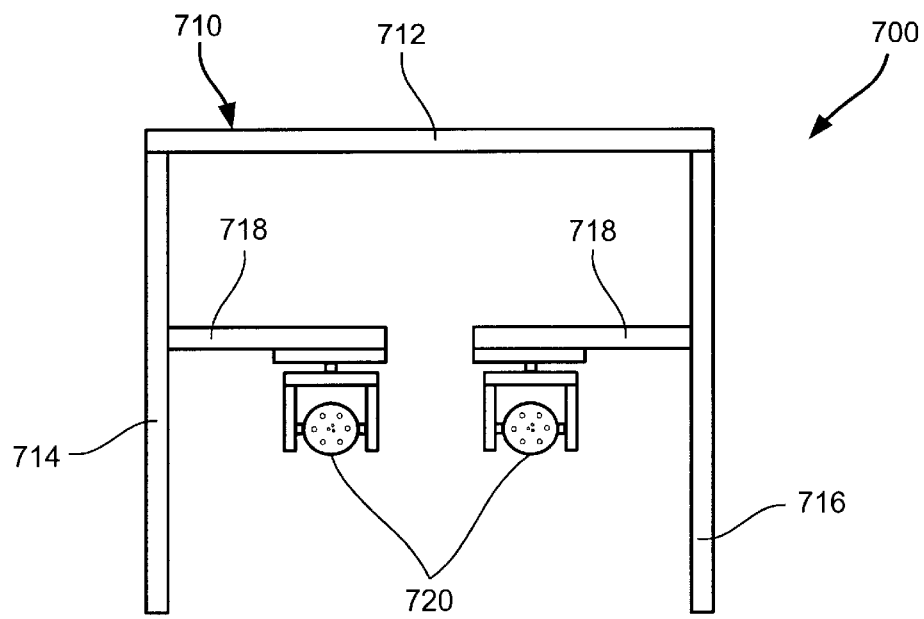
FIGS. 7A–7C depict an alternative embodiment of a system according to the present invention.
Figure 7B:
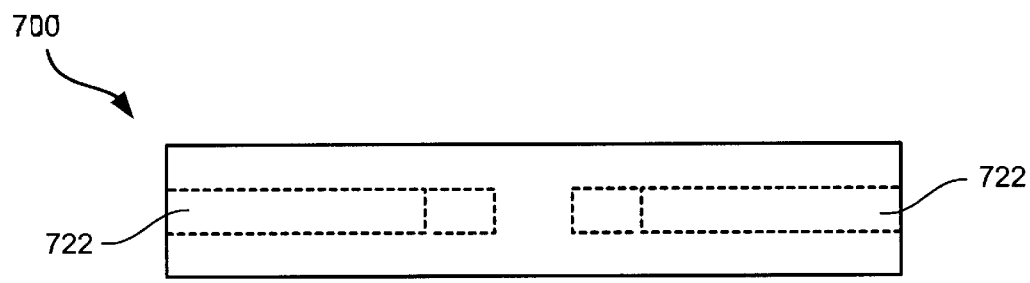
Figure 7C:

Turning now to FIGS. 7A–7C, an alternative embodiment of a system 700 according to the present invention will be described. System 700 includes a gantry 710 of similar configuration as described in conjunction with earlier figures. Namely, gantry 710 has an upper generally horizontal portion 712 and generally vertical side portions 714 and 716. Each side portion 714 and 716 has a horizontal arm 718 coupled thereto about a rotation point 722. Rotation point 722 operates to permit the rotation of horizontal arm 718 such that a nozzle assembly 720 coupled to arms 718 will be positioned in front of or behind a vehicle (not shown) passing through gantry 710. FIG. 7B depicts system 700 with horizontal arm 718 in position for washing a front or rear of a passing vehicle. Similarly, FIG. 7C depicts arm 718 swung out of the way of a passing vehicle. In this configuration, nozzle assembly 720 still may operate to wash or rinse the side of the passing vehicle. Further, arm 718 may be coupled to a moving gantry, such as gantry 110, for washing a stationary vehicle.

Figure 8A:
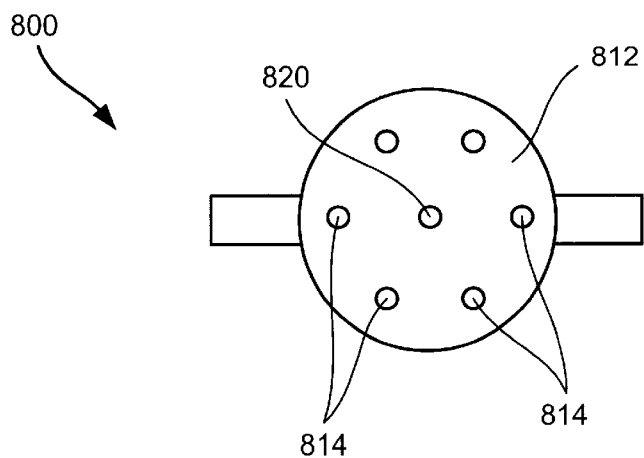
FIGS. 8A, 8B and 9 depict alternative embodiments of nozzle assemblies according to the present invention.
Figure 8B:
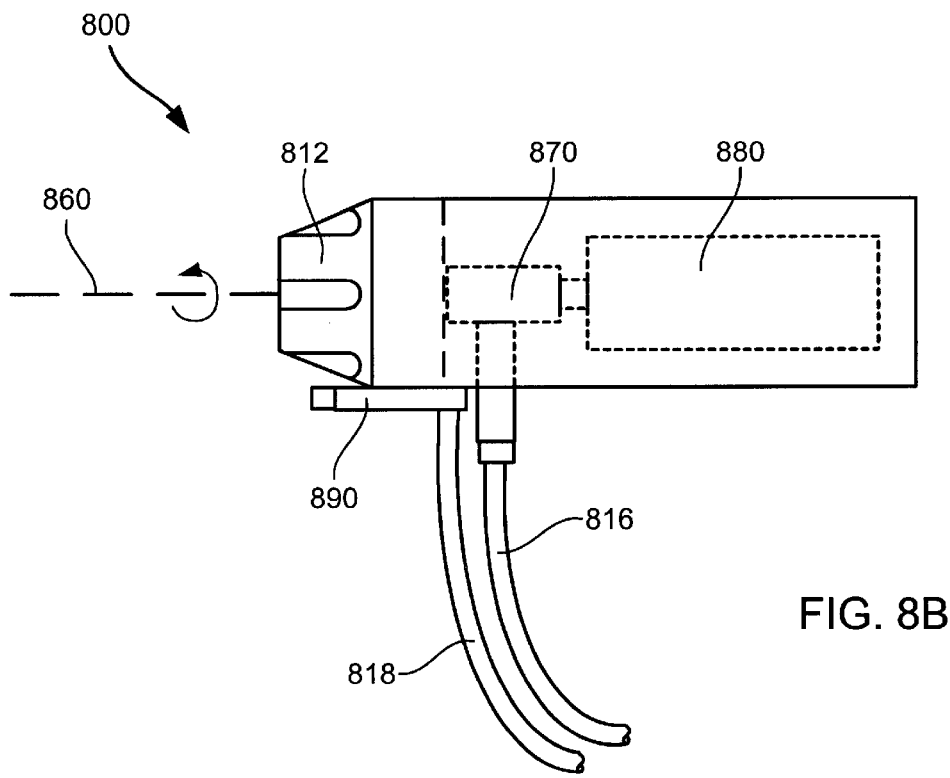

FIG. 8A depicts an alternative embodiment of the present invention which provides an additional rotational motion to a nozzle assembly 812. Apparatus 800 shown in FIG. 8A has a plurality of nozzles 814 disposed generally about the periphery of assembly 812. Further, a single chemical nozzle 820, in this case identified as a presoak nozzle 820, is positioned in the approximate center of nozzle assembly 812. As shown in FIG. 8B, apparatus 800 permits the rotation of nozzle assembly 812 notwithstanding the non-rotation of the rear components and casing which houses a gear motor 880 or the like. Rotation of nozzle assembly 812 occurs about an axis 860. As shown in FIG. 8B, another embodiment has line 818 feeding a presoak nozzle 890 disposed underneath the rotating nozzle assembly 812 as opposed to passing through assembly 812 as shown in FIG. 8A. Similarly, a rotary swivel 870 and gear motor 880 operate to provide rotation of nozzle assembly 812 in both configurations shown in FIGS. 8A and 8B. It will be appreciated by those skilled in the art that the rotational configuration shown in FIGS. 8A and 8B may be incorporated into embodiments described in conjunction with earlier figures to provide a three axis rotation of nozzles 14.

Figure 9:
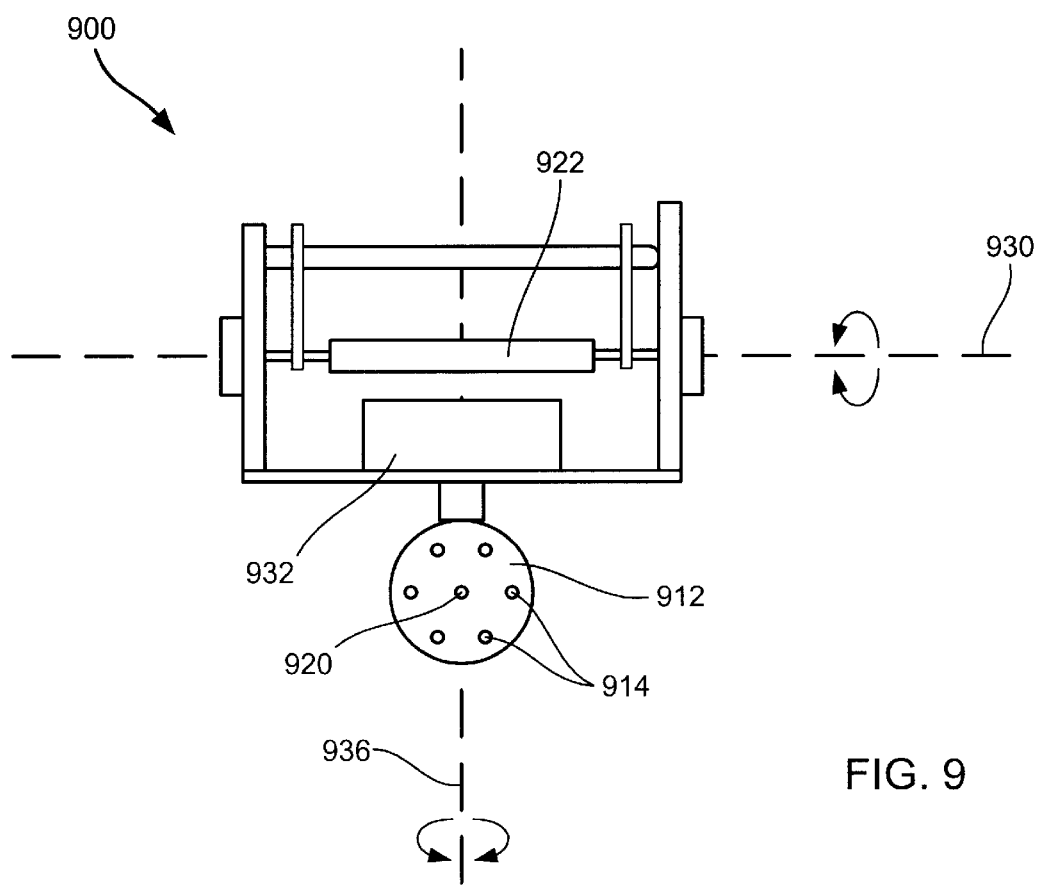

Turning now to FIG. 9, still another embodiment of the present invention will be described. FIG. 9 depicts an apparatus 900 having a nozzle assembly 912 with a plurality of nozzles 914. A center nozzle 920 is configured to provide water or other fluid similar to nozzles 914, or alternatively is coupled to a chemical line (not shown) to provide soap, wax, or other solutions. A tilt motor 922 is provided which operates to tilt housing 912 by way of a rigid support structure. Tilt rotator 922 operates to tilt assembly 912 about a tilt axis 930. Similarly, a pan rotator 932 operates to pan nozzle assembly 912 about a pan axis 936. It will be appreciated by those skilled in the art that one difference in this embodiment is the fact that the tilt rotator 922 rotator is disposed further away from nozzles 914 than is the pan rotator 932. Assembly 912 may be configured to incorporate a rotational swivel and a third rotator motor, such as that depicted in 8B, to provide a rotation of assembly 912.

Figure 10A:
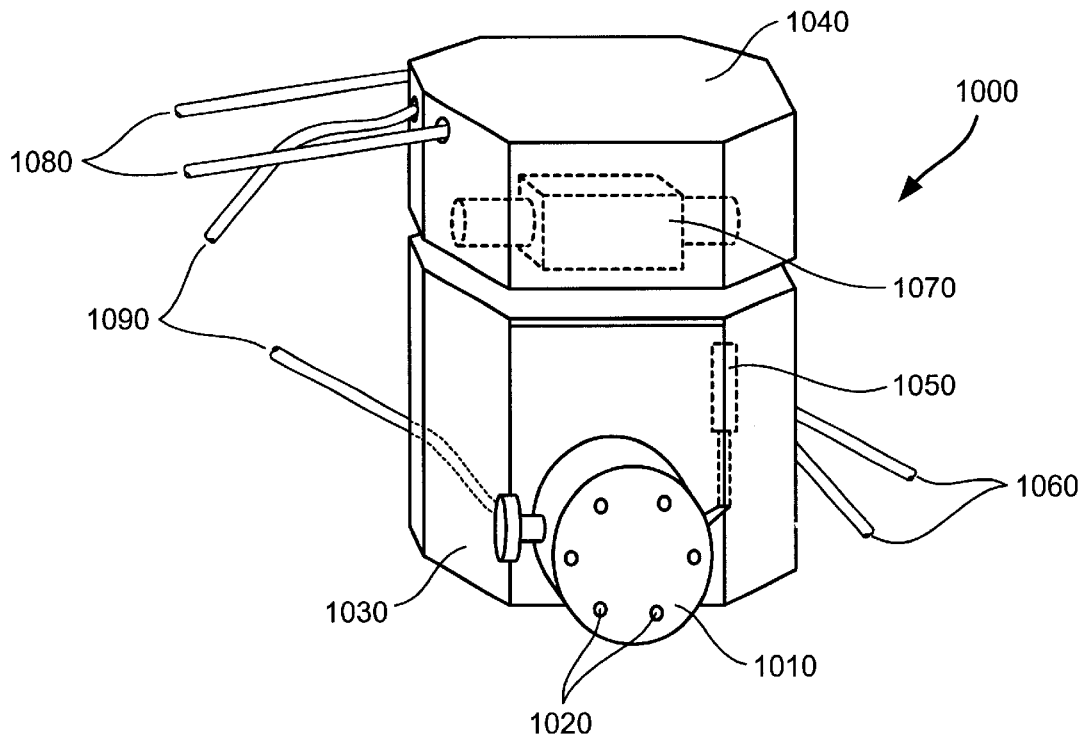
FIGS. 10A–10B depict an alternative nozzle assembly configuration according to the present invention.
Figure 10B:
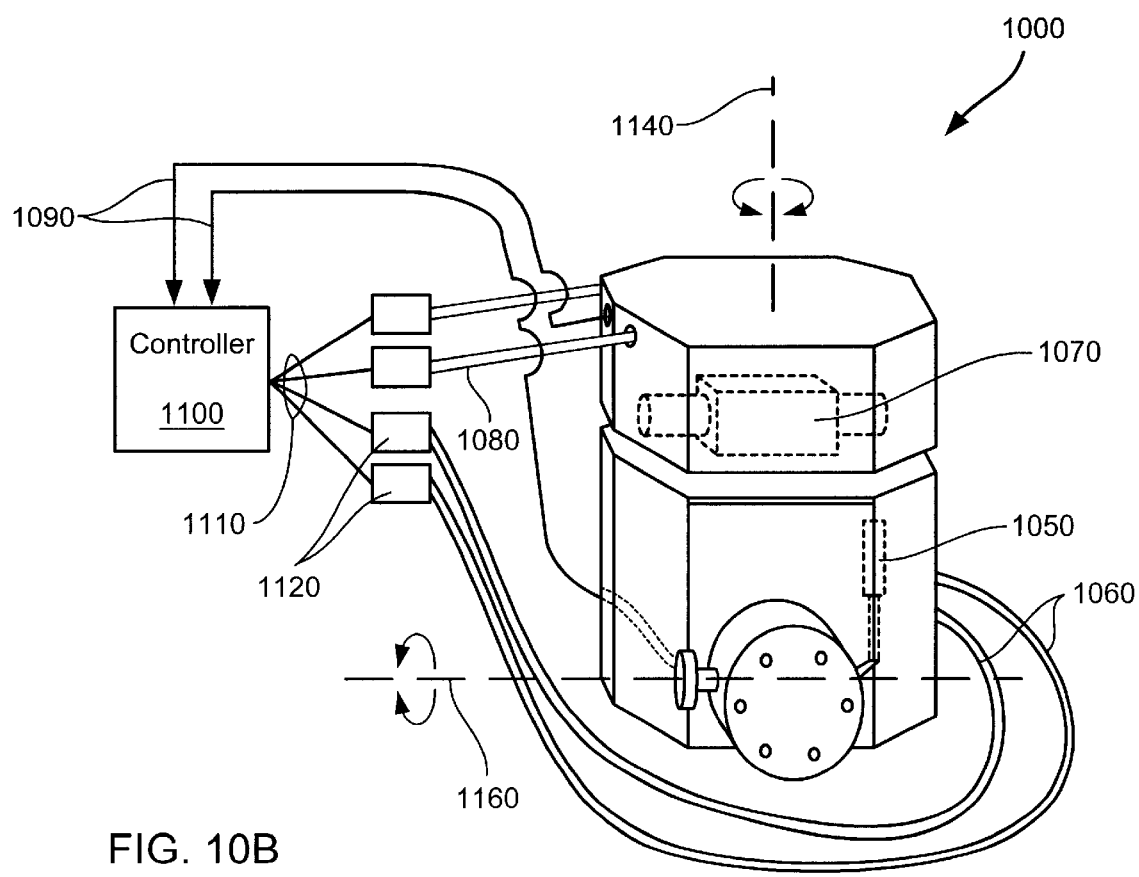

FIGS. 10A and 10B depict still another embodiment of the present invention, similar to the embodiment described in conjunction with FIGS. 1A and 1B. FIGS. 10A and 10B detail a spray apparatus 1000 having a nozzle assembly 1010 with a plurality of nozzles 1020. Preferably nozzles 1020 are zero degree nozzles adapted for delivering fluids, such as water, under high pressure. While six nozzles 1020 are shown, a greater or smaller number of nozzles 1020 may be used. Further, assembly 1010 also may include nozzles, similar to nozzles 20, located near the center of assembly 1010 for delivering rinses, soaps and the like under high, medium or low pressure. Apparatus 1000 includes a lower casing 1030 and an upper casing 1040. Lower casing 1030 includes a pneumatic cylinder 1050 coupled to air lines 1060. Cylinder 1050 operates to rotate assembly 1010 about an axis 1160 as shown in FIG. 10B. The range of rotation of assembly 1010 about axis 1160 can be less than or greater than 360 degrees, as previously described, and in one embodiment ranges from about 180 degrees to about 220 degrees.

A second pneumatic rotary cylinder 1070 is disposed in upper casing 1040, and operates to rotate lower casing 1030 about a second axis 1140 (FIG. 10B). Again, the range of rotation of lower casing 1030 can be similar to that described in conjunction with earlier Figures. Cylinders 1050 and 1070 include either a built in encoder (not shown) or have an adjacent encoder or potentiometer to facilitate operation thereof. Apparatus 1000 further includes a controller 1100, which is coupled to cylinders 1050, 1070 by encoder feedback cables. Controller is further coupled to a plurality of pneumatic valves 1120 by electrical connections 1110. Valves 1120 are coupled to cylinders 1050 and 1070 by air lines 1060 and 1080, respectively. In this manner, pneumatic cylinders operating with compressed air provide the desired tilting and panning movements of nozzle assembly 1010 as directed by controller 1100. One advantage of this pneumatic system is its ability to operate in wet environments.

Figure 11:
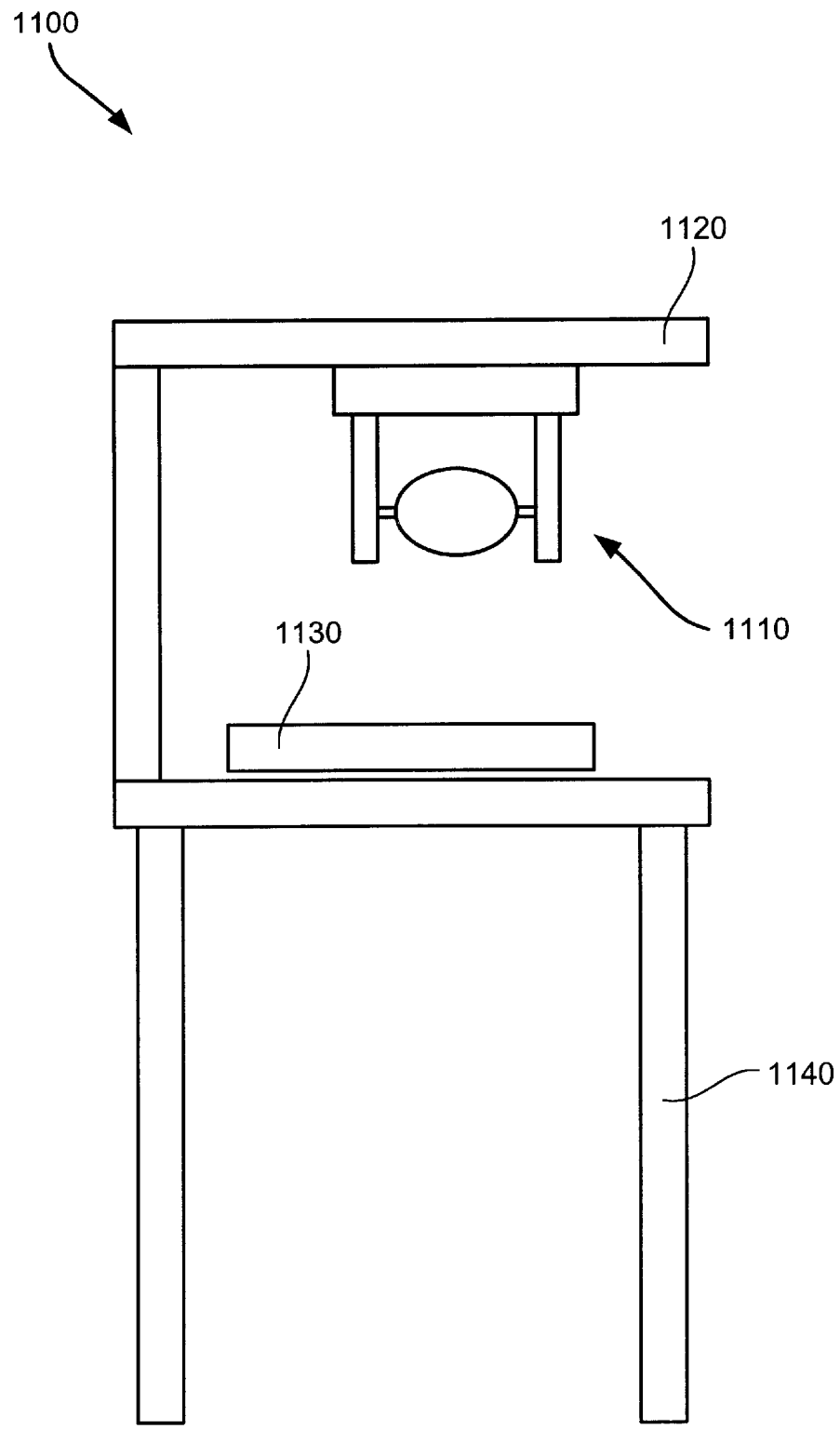
FIG. 11 depicts an alternative system according to the present invention.

It will be appreciated by those skilled in the art that the present invention has a wide range of useful applications which far surpass the vehicle washing field. For example, virtually any manufacturing or cleaning process which requires the spraying of high pressure fluid may take advantage of the combined panning and tilting characteristic of the present invention. For example, as shown in FIG. 11, a system 1100 includes a table or support structure 1140 holding a component 1130 which is to be cleaned or sprayed with a fluid. A table support 1120 is configured to permit the coupling of an apparatus 1110, such as that described in conjunction with FIG. 1, in a manner which permits the spraying of a fluid toward item 1130. Item 1130 may be stationary, or it may be on a conveyor or other moving apparatus which transfers item 1130 first under and then past spraying apparatus 11100. Item 1130 may be a completed product, or a product component.

While the present invention has been disclosed in connection with the preferred embodiments thereof, it should be understood that other embodiments may fall within the spirit and scope of the invention, as defined by the following claims. By way of example and not limitation, nozzle assemblies of the present invention may not have nozzles 20, instead having only nozzles 14. Further, rotation devices or means described herein in conjunction with one embodiment can be used in others.

What is claimed is:

1. A spray apparatus for spraying one or more liquids, said spray apparatus comprising:

a nozzle assembly having a plurality of nozzles adapted to be coupled to a liquid source;

a first rotating means for rotating said assembly about a first axis, said first rotating means providing a first range of rotation that is less than 360 degrees;

a second rotating means for rotating said assembly about a second axis that is generally perpendicular to said first axis, said second rotating means providing a second range of rotation that is less than 360 degrees; and a controller coupled to the first and second rotating means and adapted for independently controlling the first and second rotating means to direct the nozzle assembly to spray the liquid in a desired direction, wherein the desired direction is independent from a maximum range of rotation of the first and second rotating means.

2. The apparatus as in claim 1 wherein the controller is adapted to simultaneously control said first and second rotating means to cause said plurality of nozzles to spray said liquid in a desired and variable two-dimensional pattern.

3. An apparatus for use in a washing system, said apparatus comprising:

a nozzle assembly having a first plurality of nozzles coupled to a first liquid source, and a second nozzle coupled to a second liquid source;

a first rotator coupled to said nozzle assembly for rotating said nozzle assembly through a first range of rotation about a first axis;

a second rotator coupled to said nozzle assembly for rotating said nozzle assembly through a second range of rotation about a second axis, said second axis being generally perpendicular to said first axis; and a controller coupled to the first and second rotators and adapted for independently controlling the first and second rotators to direct the nozzle assembly to spray the first or second liquid in a desired direction, wherein the desired direction is independent from a maximum range of rotation of the first and second rotators.

4. The apparatus as in claim 3 wherein said first and said second range of rotation are each less than 360 degrees.

5. The apparatus as in claim 3 wherein said nozzle assembly comprises a generally cylindrical housing, said first plurality of nozzles and said second nozzle coupled to an end of said housing and adapted to spray said first liquid and said second liquid, respectively.

6. The apparatus as in claim 3 wherein said nozzle assembly comprises a generally tubular shaped housing, said first plurality of nozzles and said second nozzle adapted to spray in a generally same direction said first liquid and said second liquid, respectively.

7. The apparatus as in claim 3 wherein said first rotator tilts said nozzle assembly through said first range of rotation that is less than about 180 degrees.

8. The apparatus as in claim 3 wherein said second rotator pans said nozzle assembly through said second range of rotation that is less than about 350 degrees.

9. The apparatus as in claim 3 wherein said second rotator pans said nozzle assembly through said second range of rotation that is less than about 180 degrees.

10. The spray apparatus as in claim 1 wherein the plurality of nozzles comprise a common exit plane.

11. The apparatus as in claim 3 wherein said controller is adapted to control said first and second rotators to both rotate said nozzle assembly at a same time.

12. The apparatus as in claim 3 wherein said first and second rotators are selected from a group of rotators consisting essentially of a stepper motor, an AC motor, a servo motor, and an air-operated rotation device.

13. The apparatus as in claim 3 wherein said first plurality of nozzles comprises zero-degree nozzles.

14. The apparatus as in claim 3 wherein said first plurality of nozzles are selected from zero degree, five degree and fifteen degree nozzles.

15. The apparatus as in claim 3 wherein said first liquid source comprises water.

16. The apparatus as in claim 3 wherein said second liquid source is selected from a rust inhibitor, a liquid wax, a soap and a rinse.

17. The apparatus as in claim 3 wherein said second liquid source comprises water.

18. The apparatus as in claim 3 further comprising a third rotator for rotating said nozzle assembly through a continuous 360 degree rotation about a third axis that is generally orthogonal to said first and second axii.

19. A vehicle washing system for cleaning a vehicle, said system comprising:
 a gantry having an upper generally horizontal portion coupled between two generally vertical side portions;
 a plurality of nozzle assemblies coupled to said gantry, each having a plurality of nozzles for dispensing a fluid;
 each of said nozzle assemblies coupled to a rotator mechanism for rotating each of said assemblies about two generally perpendicular axii; and
 a controller coupled to the rotator mechanism and adapted for directing the nozzle assemblies to spray the fluid in a desired direction, wherein the desired direction is independent from and controllable relative to a maximum range of rotation of the rotator mechanism.

20. The vehicle washing system as in claim 19 wherein said plurality of nozzles comprises first and second nozzle assemblies coupled to said horizontal portion, and third and fourth nozzle assemblies coupled to said opposing vertical side portions.

21. The vehicle washing system as in claim 19 wherein said rotator mechanism is adapted to simultaneously rotate said nozzle assembly about said two generally perpendicular axii.

22. The vehicle washing system as in claim 19 wherein at least one of said rotator mechanisms comprises a first rotator and a second rotator, said first rotator for rotating said corresponding nozzle assembly about a first axis of said two generally perpendicular axii, and said second rotator for rotating said corresponding nozzle assembly about a second axis of said two generally perpendicular axii.

23. The vehicle washing system as in claim 22 wherein a first range of rotation provided by said first rotator is less than about 360 degrees, and a second range of rotation provided by said second rotator is less than about 360 degrees.

24. The vehicle washing system as in claim 19 further comprising a track on which said gantry is adapted to move, and a distance measurement device for measuring a distance said gantry moves along said track.

25. The vehicle washing system as in claim 19 further comprising a vehicle measurement device for determining a vehicle height.

26. The vehicle washing system as in claim 25 wherein said vehicle measurement device is adapted to further determine a vehicle width.

27. The vehicle washing system as in claim 25 wherein said vehicle measurement device comprises a camera positioned to record an image of said vehicle.

28. The vehicle washing system as in claim 25 wherein said vehicle measurement device further comprises a plurality of sensors for sensing said vehicle height.

29. The vehicle washing system as in claim 24 further comprising a vehicle measurement device for determining a vehicle height.

30. The vehicle washing system as in claim 29 further comprising a controller for determining a vehicle profile by combining data from said distance measurement device and said vehicle measurement device.

31. The vehicle washing system as in claim 20 wherein said third and fourth nozzle assemblies are each coupled to said side portions by a rotatable support member that is adapted to rotate said third and fourth nozzle assemblies relative to said side portions to be positioned generally between said side portions.

32. The vehicle washing system as in claim 19 wherein said plurality of nozzles comprises between about 5 and about 20 nozzles.

33. The vehicle washing system as in claim 19 further comprising a second gantry, said second gantry:
 having an upper generally horizontal portion coupled between two generally vertical side portions;
 positioned to be spaced apart from said first gantry; and
 having a plurality of nozzle assemblies coupled thereto, each of said nozzle assemblies coupled to a rotator mechanism for rotating said corresponding nozzle assembly about a first axis and about a second axis that is generally perpendicular to said first axis.

34. The vehicle washing system as in claim 33 wherein said rotator mechanism is adapted to provide less than a 360 degree rotation about said first axis and to provide less than a 360 degree rotation about said second axis.

35. The vehicle washing system as in claim 33 wherein said second gantry is coupled to said first gantry to form a stationary frame adapted to wash a stationary vehicle.

36. The vehicle washing system as in claim 31 wherein said plurality of nozzles comprises zero-degree nozzles.

37. A method of spraying one or more liquids, said method comprising:
 providing an apparatus as in claim 3;
 rotating said nozzle assembly about said first axis while spraying a liquid from at least one of said plurality of nozzles; and
 rotating said nozzle assembly about said second axis while spraying said liquid from said at least one of said plurality of nozzles;
 wherein said controller controls the nozzle assembly rotation about the first and second axii in a manner which directs the spraying of the liquid towards a desired location on an item to be washed, the controller further controlling the rotation of the nozzle assembly about the first and second axii independently from a maximum range of rotation available about the first and second axii.

38. The method of claim 37 wherein said rotating said nozzle assembly about said first and second axii provide a pan and a tilt motion, respectively, said pan and tilt motion each being less than a 360 degrees motion.

39. The method of claim 37 wherein said rotating said nozzle assembly about said first and second axii comprises simultaneously rotating said nozzle assembly about said first and second axii to cause said plurality of nozzles to spray said liquid in a nonlinear trajectory.

40. The method of claim 37 further comprising rotating said nozzle assembly about a third axis that is generally perpendicular to said first and second axii.

41. The method of claim 40 wherein said rotation about said third axis is a continuous 360 degree rotation.

42. A method of washing a vehicle having sides, a front end and a rear end, said method comprising:
providing a washing system as provided in claim 19;
positioning said vehicle underneath said gantry;
providing relative movement between said gantry and said vehicle to produce a vehicle size profile unique to said vehicle model to be washed, said vehicle size profile comprising a height of said vehicle as a function of a length of said vehicle; and
spraying said vehicle with a liquid from at least some of said nozzle assemblies.

43. The method as in claim 42 wherein said providing relative movement comprises:
incrementally measuring a vehicle height with a plurality of sensors to create a vehicle height profile;
passing said gantry over said vehicle to incrementally measure a distance said gantry moves to create a distance profile; and
correlating said height profile with said distance profile to determine said vehicle size profile.

44. The method of claim 42 wherein said vehicle size profile further includes a vehicle width profile.

45. The method of claim 42 wherein said washing system further comprises a controller for controlling said spraying.

46. The method of claim 45 wherein said controller is adapted to control said measuring and correlating.

47. The method of claim 42 wherein said gantry is a stationary gantry, said relative movement provided by a vehicle movement.

48. The method of claim 42 wherein said system further comprises a track for providing a controlled gantry movement, said relative movement provided by said gantry movement.

49. A vehicle washing apparatus comprising:
a stationary frame adapted for receiving a vehicle to be washed thereunder;
a plurality of nozzle assemblies coupled to the frame, at least some of the nozzle assemblies coupled to a rotator, the rotator adapted to separately rotate the nozzle assembly about two non-parallel axii; and
a controller for controlling the rotator to direct the nozzle assemblies to spray a liquid in a desired pattern towards the vehicle;
wherein the controller and nozzle assemblies are positioned and adapted to spray the liquid on a complete upper surface and a complete side surface of the vehicle when the vehicle is stationed under the frame.

50. The method as in claim 42 further comprising controlling the nozzle assemblies based on the vehicle size profile to direct the liquid at a desired point on the vehicle.

51. A washing system, comprising:
a nozzle assembly comprising:
a first rotating mechanism;
a second rotating mechanism; and
a nozzle;
wherein the first and second rotating mechanisms are operatively connected to the nozzle so that the nozzle is capable of projecting a fluid in a direction having a vertical and a horizontal orientation, the nozzle being selectively pivotable about a first rotation axis and selectively independently pivotable about a second rotation axis offset from the first rotation axis; and
a controller operatively connected to the first and second rotating mechanisms, the controller being capable of selectively pivoting the nozzle about the first rotation axis and selectively pivoting the nozzle about the second rotation axis to alter at least one of the horizontal and vertical orientations of the direction of the fluid projection, the controller being capable of pivoting the nozzle about the first rotation axis independently of pivoting the nozzle about the second rotation axis.

52. A method of washing a vehicle, the method comprising:
providing a nozzle assembly comprising;
a first rotating mechanism;
a second rotating mechanism; and
a nozzle;
wherein the first and second rotating mechanisms are operatively coupled to the nozzle so that the nozzle is capable of projecting a fluid in a direction having a vertical orientation and a horizontal orientation, the nozzle being selectively pivotable about a first rotation axis and selectively independently pivotable about a second rotation axis offset from the first rotation axis;
independently controlling the first and second rotating mechanisms so as to cause pivotal movement of the nozzle about at least one of the first and second rotation axii to alter at least one of the vertical orientation and horizontal orientation of the direction of the fluid projection by an amount not dependent on a maximum range of rotation of the first and second mechanisms; and
projecting the fluid from the nozzle onto the vehicle.

53. The method of claim 52 further comprising determining at least a two dimensional profile of the vehicle to be washed and independently controlling the first and second rotating mechanisms using the profile.

54. The method of claim 53 wherein the profile comprises a three dimensional vehicle profile.

55. The vehicle washing apparatus as in claim 49 wherein the controller and rotator are adapted for rotating the nozzle assemblies through a range of rotation about either the first or second axii that is less than a maximum range of rotation of the rotator.

* * * * *